(12) United States Patent
Aoki et al.

(10) Patent No.: US 11,754,084 B2
(45) Date of Patent: Sep. 12, 2023

(54) MOTOR DRIVE CONTROL DEVICE USING FEEDBACK SPEED CONTROL AND MOTOR CURRENT CONTROL

(71) Applicant: MINEBEA MITSUMI Inc., Nagano (JP)

(72) Inventors: Masato Aoki, Iwata (JP); Yuji Omura, Shizuoka (JP); Takahiro Suzuki, Fukuroi (JP)

(73) Assignee: MINEBEA MITSUMI Inc., Nagano (JP)

( * ) Notice: Subject to any disclaimer, the term of this patent is extended or adjusted under 35 U.S.C. 154(b) by 618 days.

(21) Appl. No.: 16/805,975

(22) Filed: Mar. 2, 2020

(65) Prior Publication Data

US 2020/0284266 A1    Sep. 10, 2020

(30) Foreign Application Priority Data

Mar. 4, 2019  (JP) ................................. 2019-038257
Mar. 4, 2019  (JP) ................................. 2019-038258

(51) Int. Cl.
*F04D 27/00*  (2006.01)
*F04D 25/06*  (2006.01)
(Continued)

(52) U.S. Cl.
CPC .......... *F04D 27/004* (2013.01); *F04D 25/06* (2013.01); *H02P 29/045* (2013.01);
(Continued)

(58) Field of Classification Search
CPC ................ H02P 25/0805; H02P 29/045; F04B 2203/0211
See application file for complete search history.

(56) References Cited

U.S. PATENT DOCUMENTS 7,560,893 B2 *  7/2009  Thomson .................. H02P 8/14
                                                 318/400.11
8,292,595 B2 * 10/2012  Jeung ..................... F04D 27/004
                                                 417/44.11
(Continued)

FOREIGN PATENT DOCUMENTS

JP    2001-193688 A    7/2001
JP    2009-174414 A    8/2009
(Continued)

OTHER PUBLICATIONS

Decision to Grant a Patent dated Mar. 7, 2023 for the corresponding Japanese Application No. 2019-038257 and English translation.
(Continued)

*Primary Examiner* — Nathan C Zollinger
*Assistant Examiner* — Timothy P Solak
(74) *Attorney, Agent, or Firm* — Pearne & Gordon LLP

(57) ABSTRACT

A motor drive control device has a control circuit that generates a drive control signal for controlling a rotational speed of a motor based on a speed command signal indicating a target rotational speed of the motor, and a motor driving unit that drives the motor based on the drive control signal. The control circuit performs speed feedback control for generating the drive control signal so that the rotational speed of the motor coincides with the target rotational speed when the target rotational speed is lower than a rotational speed threshold value, and generates the drive control signal based on a relationship between current flowing through the motor and a reference current value when the target rotational speed is higher than the rotational speed threshold value.

14 Claims, 15 Drawing Sheets

(51) Int. Cl.
  *H02P 29/04* (2006.01)
  *F04D 29/66* (2006.01)
  *F04B 49/06* (2006.01)

(52) U.S. Cl.
  CPC ..... *F04B 49/065* (2013.01); *F04B 2203/0201* (2013.01); *F04B 2203/0209* (2013.01); *F04B 2203/0211* (2013.01); *F04D 29/66* (2013.01)

(56) References Cited

U.S. PATENT DOCUMENTS

| | | | |
|---|---|---|---|
| 9,074,596 B2* | 7/2015 | Miyamoto | F04B 49/20 |
| 9,732,973 B2* | 8/2017 | Park | F04D 27/004 |
| 2014/0001999 A1 | 1/2014 | Sato | |
| 2015/0372630 A1 | 12/2015 | Ishikawa | |

FOREIGN PATENT DOCUMENTS

| | | |
|---|---|---|
| JP | 2013-046488 A | 3/2013 |
| JP | 2015-124930 A | 7/2015 |
| JP | 2016-010218 A | 1/2016 |
| WO | 2016042696 A1 | 3/2016 |

OTHER PUBLICATIONS

Decision to Grant a Patent dated Mar. 7, 2023 for the corresponding Japanese Application No. 2019-038258 and English translation.
Notice of Reasons for Refusal dated Nov. 8, 2022 for the corresponding Japanese Application No. 2019-038257 and English translation.
Notice of Reasons for Refusal dated Nov. 8, 2022 for the corresponding Japanese Application No. 2019-038258 and English translation.

* cited by examiner

MOTOR DRIVE CONTROL DEVICE USING FEEDBACK SPEED CONTROL AND MOTOR CURRENT CONTROL

CROSS REFERENCE TO RELATED APPLICATIONS

This application claims the benefits of Japanese Patent Applications No. 2019-038257 and No. 2019-038258, filed Mar. 4, 2019, which is hereby incorporated by reference in its entirety.

BACKGROUND

Technical Field

The present disclosure relates to a motor drive control device, a fan, and a motor drive control method, and relates to, for example, a motor drive control device that controls the air volume of a fan rotated by a motor.

Background

Conventionally, fans (fan motors) have been widely known as devices for cooling components and the like which are provided inside home appliances, OA devices and the like.

In general, the performance of a fan is expressed by an air volume-static pressure characteristic (hereinafter also referred to as "P-Q curve"). The P-Q curve represents relationship between the air volume and the loss (static pressure) caused by the pressure between a suction port and a discharge port of the fan. In the P-Q curve, when the static pressure is maximum (ventilation resistance is maximum), the air volume of the fan becomes zero, and when the static pressure is zero (ventilation resistance is zero), the air volume of the fan becomes maximum (for example, see Japanese Patent Laid-Open No. 2009-174414).

Note that a state where the static pressure is zero, that is, the air volume of the fan is maximum is also referred to as "free air state".

SUMMARY

Generally, a fan is designed so that a required air volume can be obtained in a predetermined operating range (for example, a region where the static pressure is in a middle range). In other words, the fan is designed so as to realize a P-Q curve that provides a predetermined air volume in the required operating range. On the other hand, for the fan, quietness is more important than air volume in a region other than the required operating range, for example, a region where the static pressure is a predetermined value or less.

With respect to conventional fans, the rotational speed of a motor is controlled so as to obtain a rotational speed instructed by a host device, and the air volume changes depending on a pressure loss (static pressure). For this reason, the conventional fans have a problem that an air volume equal to or higher than an air volume in a required operating range occurs in a region where the static pressure is low like a free air state, resulting in increased noise.

The present disclosure is related to enhancing quietness while securing a necessary air volume in a fan.

A motor drive control device according to a representative embodiment of the present disclosure comprises a control circuit that generates a drive control signal for controlling a rotational speed of a motor based on a speed command signal indicating a target rotational speed of the motor, and a motor driving unit that drives the motor based on the drive control signal, wherein the control circuit performs speed feedback control for generating the drive control signal so that the rotational speed of the motor coincides with the target rotational speed when the target rotational speed is lower than a rotational speed threshold value, and generates the drive control signal based on a relationship between current flowing through the motor and a reference current value when the target rotational speed is higher than the rotational speed threshold value.

According to the motor drive control device of the present disclosure, it is possible to realize a fan having enhanced quietness while ensuring a necessary air volume.

DETAILED DESCRIPTION

1. Outline of Embodiments

Figure 1:
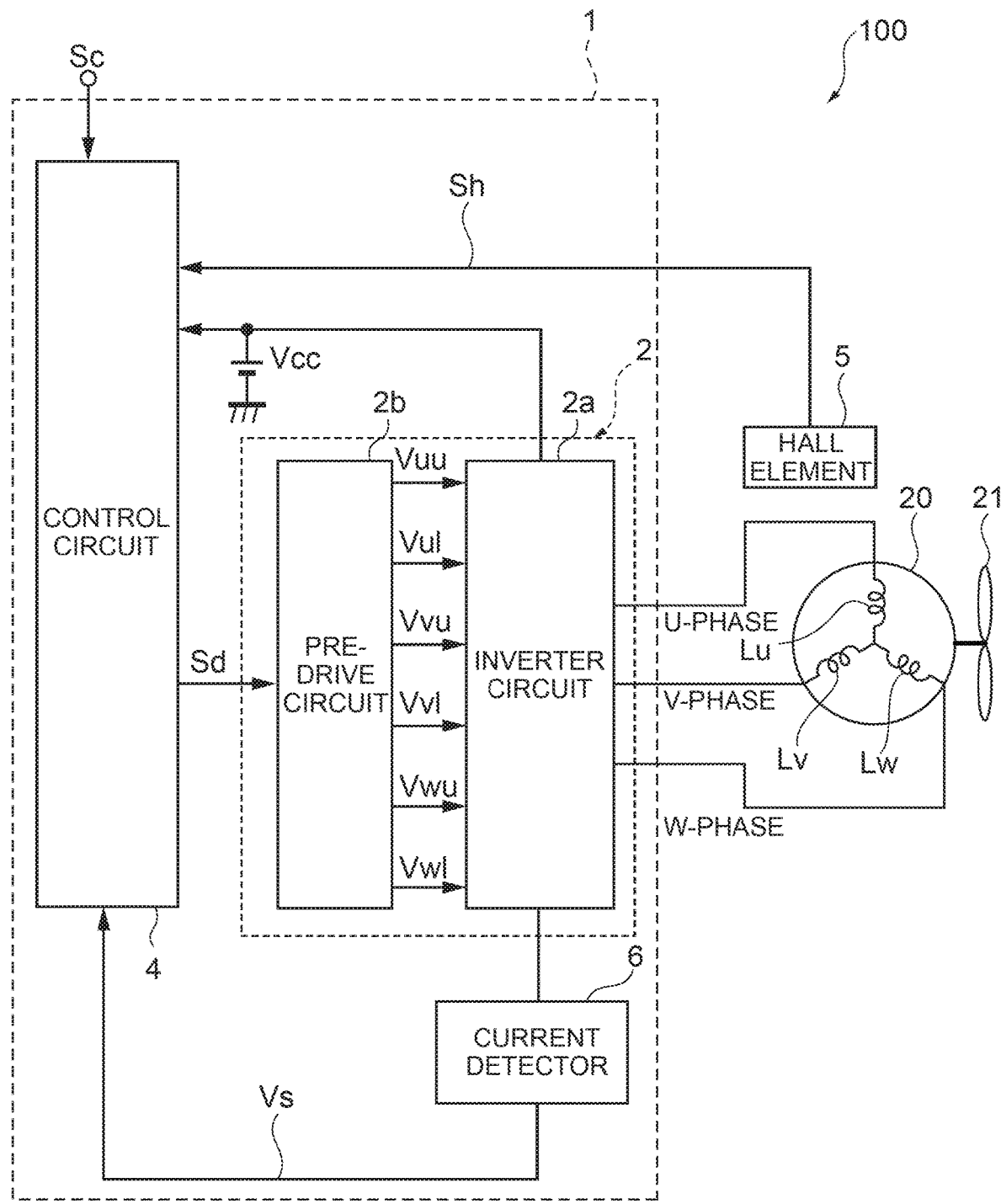
FIG. 1 is a block diagram showing a configuration of a fan according to a first embodiment of the present disclosure.

First, an outline of a representative embodiment of the disclosure disclosed in the present application will be described. Note that in the following description, as an example, reference signs on the drawings which correspond to components of the disclosure are shown in parentheses.

[1] A motor drive control device (1, 1A) according to a representative embodiment of the present disclosure includes a control circuit (4, 4A) for generating a drive control signal (Sd) for controlling the rotational speed of a motor (20) based on a speed command signal (Sc) for indicating a target rotational speed (Rtg) of the motor (20), and a motor driving unit (2) for driving the motor based on the drive control signal. The control circuit performs speed feedback control for generating the drive control signal so that the rotational speed of the motor coincides with the target rotational speed when the target rotational speed is lower than a rotational speed threshold value (Rth), and generates the drive control signal based on the relationship between current flowing through the motor and a reference current value (Itg, Ith) when the target rotational speed is higher than the rotational speed threshold value.

[2] In the motor drive control device (1) of the foregoing [1], the reference current value may be a target current value (Itg) to be calculated in association with the rotational speed of the motor, and the control circuit may perform maximum air volume control for generating the drive control signal so that the current flowing through the motor approaches the target current value when the target rotational speed is higher than the rotational speed threshold value.

[3] In the motor drive control device (1) of the foregoing [2], the control circuit (4) may calculate an actual rotational speed of the motor based on a position detection signal (Sh) indicating a rotational position of the motor, and calculate the target current based on prestored correspondence relationship information (471) indicating the correspondence relationship between the rotational speed of the motor and the target current value and the calculated actual rotational speed.

[4] In the motor drive control device (1) of the foregoing [3], the motor may rotate an impeller (21) in the fan (100), and the correspondence relationship may represent the relationship between the rotational speed of the motor and the target current value in a region where the static pressure of the fan is lower than a predetermined value (Pb).

[5] In the motor drive control device (1) according to the foregoing [3] or [4], under the maximum air volume control, the control circuit (4) may generate the drive control signal so that the rotational speed (Rr) of the motor increases when current (Ir) flowing through the motor is higher than the target current value (Itg), and generate the drive control signal so that the rotational speed (Rr) of the motor decreases when the current (Ir) flowing through the motor is lower than the target current value (Itg).

[6] In the motor drive control device (1) according to the foregoing [5], under the maximum air volume control, the control circuit (4) may generate the drive control signal so as to increase the rotational speed of the motor when the current (Ir) flowing through the motor is higher than a predetermined range (M) containing the target current value (Itg) as a reference, so as to make the rotational speed of the motor unchanged when the current (Ir) flowing through the motor is within the predetermined range (M), and so as to reduce the rotational speed of the motor when the current (Ir) flowing through the motor is lower than the predetermined range (M).

[7] In the motor drive control device (1) according to any one of the foregoing [3] to [6], the control circuit (4) may include a rotational speed calculator (42) for calculating the actual rotational speed (Rr) based on the position detection signal (Sh), a speed controller (43) for generating a first control signal (Sp1) so that the actual rotational speed (Rr) calculated by the rotational speed calculator coincides with the target rotational speed (Rtg) indicated by the speed command signal (Sc), a target current value calculator (47) for calculating the target current value (Itg) based on the actual rotational speed (Rr) calculated by the rotational speed calculator, a current value acquisition unit (46) for acquiring a current value of current flowing through the motor, a maximum air volume controller (44) for generating a second control signal (Sp2) so that the current (Ir) flowing through the motor approaches the target current value (Itg) when the target rotational speed (Rtg) is higher than the rotational speed threshold value (Rth), and a drive control signal generator (45) for generating the drive control signal (Sd) based on the first control signal and the second control signal.

[8] In the motor drive control device (1A) of the foregoing [1], the reference current value may be a current threshold value (Ith) for estimating an external pressure, and when the target rotational speed is higher than the rotational speed threshold value, based on a comparison result between the actual current value of the current flowing through the motor and the current threshold value, the control circuit (4A) may perform switching between the speed feedback control and the maximum air volume control for generating the drive control signal so that the rotational speed of the motor does not exceed the rotational speed threshold value.

[9] In the motor drive control device (1A) of the foregoing [8], under a state where the target rotational speed is higher than the rotational speed threshold value, the control circuit (4A) may perform the speed feedback control when the actual current value is larger than the current threshold value, and perform the maximum air volume control when the actual current value is smaller than the current threshold value.

[10] In the motor drive control device (1A) of the foregoing [8], the control circuit (4A) may generate the drive control signal in the maximum air volume control so that the motor rotates at a constant rotational speed corresponding to the rotational speed threshold value.

[11] In the motor drive control device (1A) of any one of the foregoing [8] to [10], the control circuit (4A) may include a rotational speed calculator (42A) for calculating an actual rotational speed of the motor based on a position detection signal indicating the rotational position of the motor, a speed controller (43A) for generating a first control signal (Sp1) so that the actual rotational speed calculated by the rotational speed calculator coincides with the target rotational speed indicated by the speed command signal, a current value acquisition unit (46A) for acquiring the actual current value (Ir), a maximum air volume controller (44A) for generating a second control signal (Sp2) so that the rotational speed of the motor does not exceed the rotational speed threshold value when the target rotational speed is larger than the rotational speed threshold value and the actual current value acquired by the current value acquisition unit is larger than the current threshold value, and a drive control signal generator (45A) for generating the drive control signal based on the first control signal or the second control signal.

[12] A fan (100, 100A) according to a representative embodiment of the present disclosure includes a motor (20), an impeller (21) configured to be rotatable by rotational force of the motor (20), and a motor drive control device (1, 1A) for controlling driving of the motor, wherein the motor drive control device comprises a control circuit (4, 4A) for generating a drive control signal (Sd) for controlling a rotational speed of the motor based on a speed command signal (Sc) indicating a target rotational speed (Rtg) of the motor, and a motor driving unit (2) for driving the motor based on the drive control signal, and the control circuit performs speed feedback control for generating the drive control signal so that the rotational speed of the motor coincides with the target rotational speed when the target rotational speed (Rtg) is lower than the rotational speed threshold value (Rth), and generates the drive control signal based on a relationship between current (Ir) flowing through the motor and a reference current value (Itg, Ith) when the target rotational speed is higher than the rotational speed threshold value.

[13] In the fan (100) of the foregoing [12], the reference current value may be a target current value (Itg) to be calculated in association with the rotational speed of the motor, and the control circuit (4) may perform maximum air volume control for generating the drive control signal so that current flowing through the motor approaches the target current value when the target rotational speed is higher than the rotational speed threshold value.

[14] In the fan (100A) of the foregoing [12], when the target rotational speed is higher than the rotational speed threshold value, based on a comparison result between an actual current value of current flowing through the motor and a current threshold value (Ith) as the reference current value, the control circuit (4A) may perform switching between the speed feedback control and the maximum air volume control for generating the drive control signal so that the rotational speed of the motor does not exceed the rotational speed threshold value.

[15] A motor drive control method according to a representative embodiment of the present disclosure is a method for generating a drive control signal (Sd) for controlling driving of a motor (20) based on a speed command signal (Sc) indicating a target rotational speed (Rtg) of the motor (20), and driving the motor based on the drive control signal, and includes a first step (S3, S3A) of performing speed feedback control for generating the drive control signal so that a rotational speed of the motor coincides with the target rotational speed when the target rotational speed is lower than a rotational speed threshold value (Rth), and a second step (S4 to S14, S3A, S5A to S9A) of generating the drive control signal based on a relationship between current flowing through the motor and a reference current value when the target rotational speed is higher than the rotational speed threshold value.

[16] In the motor drive control method of the foregoing [15], the reference current value may be a target current value (Itg) to be calculated in association with a rotational speed of the motor, and the second step may include a third step (S4 to S14) of performing maximum air volume control for generating the drive control signal so that current flowing through the motor approaches the target current value when the target rotational speed is higher than the rotational speed threshold value.

[17] In the motor drive control method according to the foregoing [15], the reference current value may be a current threshold value (Ith) for estimating an external pressure, and the second step may include a third step (S3A, S5A to S9A) of performing, based on a comparison result between an actual current value of current flowing through the motor and the current threshold value, switching between the speed feedback control and maximum air volume control for generating the drive control signal so that a rotational speed of the motor does not exceed the rotational speed threshold value when the target rotational speed is higher than the rotational speed threshold value.

2. Specific Examples of Embodiments

Hereinafter, specific examples of the embodiments of the present disclosure will be described with reference to the drawings. In the following description, the same reference signs are given to components common to the respective embodiments, and duplicative description is omitted.

First Embodiment

FIG. 1 is a block diagram showing a configuration of a fan according to the first embodiment of the present disclosure.

A fan 100 according to a first embodiment is a device for generating wind by rotating an impeller (vane wheel). The fan 100 can be used as one of cooling devices for discharging heat generated inside equipment to the outside and cooling the inside of the equipment. The fan 100 is an axial fan, for example.

As shown in FIG. 1, the fan 100 includes a motor 20, a motor drive control device 1 for driving the motor 20, and an impeller 21 that is configured to be rotatable by the rotational force of the motor 20.

In the first embodiment, the motor 20 is, for example, a three-phase brushless motor having coils Lu, Lv, and Lw. The motor drive control device 1 is a device for controlling the rotation of the motor 20. The motor drive control device 1 rotates the motor 20 by causing a drive current to periodically flow through the three-phase coils Lu, Lv, and Lw constituting the motor 20.

Specifically, the motor drive control device 1 includes a motor driving unit 2, a control circuit 4, and a current detector 6. Note that components of the motor drive control device 1 shown in FIG. 1 are parts of the whole, and the motor drive control device 1 may include other components in addition to those shown in FIG. 1.

In the first embodiment, at least a part of the motor drive control device 1 is packaged as one semiconductor device (IC: Integrated Circuit). For example, circuits such as the control circuit 4 and the motor driving unit 2 are implemented as separate semiconductor devices.

Note that the motor drive control device 1 may be a semiconductor device which is packaged in its entirety, or all or a part of the motor drive control device 1 and another device may be packaged together to configure a single semiconductor device.

The motor driving unit 2 outputs a drive signal to the motor 20 based on the drive control signal Sd output from the control circuit 4 to drive the motor 20. The motor driving unit 2 selectively energizes the coils Lu, Lv, Lw of plural phases of the motor 20.

Specifically, the motor driving unit 2 includes an inverter circuit 2a and a pre-drive circuit 2b. The pre-drive circuit 2b generates an output signal for driving the inverter circuit 2a based on the drive control signal Sd output from the control circuit 4, and outputs the output signal to the inverter circuit 2a. The inverter circuit 2a energizes the coils Lu, Lv, Lw included in the motor 20 based on a signal output from the pre-drive circuit 2b.

Specifically, the inverter circuit 2a is configured, for example, so that a pair of series circuits each including two switching elements provided at both ends of a power supply voltage (DC power supply) Vcc are arranged for each phase (U-phase, V-phase, W-phase) of the coils Lu, Lv, Lw. In each pair of two switching elements, a terminal of each phase of the motor 20 is connected to a connection point between the switching elements. The pre-drive circuit 2b outputs, for example, six types of signals Vuu, Vul, Vvu, Vvl, Vwu, and Vwl corresponding to the respective switching elements of the inverter circuit 2a as output signals. By outputting these signals Vuu, Vul, Vvu, Vvl, Vwu, and Vwl, the switching elements corresponding to the signals Vuu, Vul, Vvu, Vvl, Vwu, and Vwl respectively are turned on/off. As a result, a drive signal is output to the motor 20, and current flows through the coil Lu, Lv, Lw of each phase of the motor 20.

The current detector 6 is a functional unit for detecting current flowing through the motor 20, that is, current flowing through the coils Lu, Lv, and Lw of the motor 20 (hereinafter also referred to as "motor current"). The current detector 6 outputs a voltage Vs corresponding to the motor current of the motor 20. Note that the configuration of the current detector 6 will be described later The control circuit 4 is configured to include, for example, a microcomputer (MCU (Micro Controller Unit)) having a processor (for example, CPU) and various memories, a digital circuit, an analog circuit, and the like. Various signals for instructing driving of the motor 20 are input to the control circuit 4. The control circuit 4 performs driving control of the motor 20 based on these input signals. For example, a speed command signal Sc as a signal for instructing driving of the motor 20 is input to the control circuit 4 from a device provided outside the control circuit 4 such as a host device.

The speed command signal Sc is a signal related to the rotational speed of the motor 20. For example, the speed command signal Sc is a pulse width modulation (PWM) signal having a duty ratio corresponding to a target rotational speed Rtg of the motor 20. Note that a clock signal may be input as the speed command signal Sc.

Furthermore, a position detection signal Sh is input from a position detection element 5 to the control circuit 4. The position detection element 5 is, for example, a Hall element disposed in the motor 20. The position detection signal Sh is a Hall signal output from the Hall element as the position detection element 5. The position detection signal Sh is a signal indicating the rotational position of the motor 20, that is, a signal corresponding to rotation of a rotor (not shown) of the motor 20. Hereinafter, the position detection element 5 is also referred to as "Hall element 5".

The control circuit 4 obtains information on the actual rotational speed of the rotor of the motor 20 from the position detection signal Sh to control the driving of the motor 20.

Note that FIG. 1 illustrates a case where one Hall element 5 is arranged in the fan 100, but the number of Hall elements 5 to be arranged in the fan 100 is not particularly limited. For example, three Hall elements 5 may be arranged around the rotor of the motor 20 at substantially equal intervals.

Note that the control circuit 4 may be configured to receive other information related to the rotation state of the motor 20 in addition to the position detection signal Sh or instead of the position detection signal Sh. For example, the control circuit 4 may be configured to receive, as an FG signal corresponding to the rotation of the rotor of the motor 20, a signal (pattern FG) generated by using a coil pattern which is provided on a substrate on the side of the rotor. Furthermore, the control circuit 4 may be configured so that the rotation state of the motor 20 is detected based on a detection result of a rotational position detection circuit for detecting a back electromotive force induced in each phase (U, V, W phase) of the motor 20. An encoder, a resolver, or the like may be provided so that information such as the rotational speed of the motor 20 can be detected.

The control circuit 4 generates a drive control signal Sd for controlling the rotational speed of the motor 20 based on the speed command signal Sc, the position detection signal Sh, the voltage Vs, and the like described above.

The drive control signal Sd is, for example, a pulse width modulation (PWM) signal. The control circuit 4 supplies the motor driving unit 2 with the drive control signal Sd as a PWM signal, thereby adjusting the rotational speed of the motor while switching, in a predetermined order, an energized phase among the coils Lu, Lv, Lw of plural phases to be energized by the motor driving unit 2. As a result, the air volume of the fan 100 is controlled.

The motor drive control device 1 according to the first embodiment controls the rotational speed of the motor 20 so that the air volume of the fan 100 is limited in a region where the static pressure of the fan 100 is equal to or less than a predetermined value.

Figure 2:
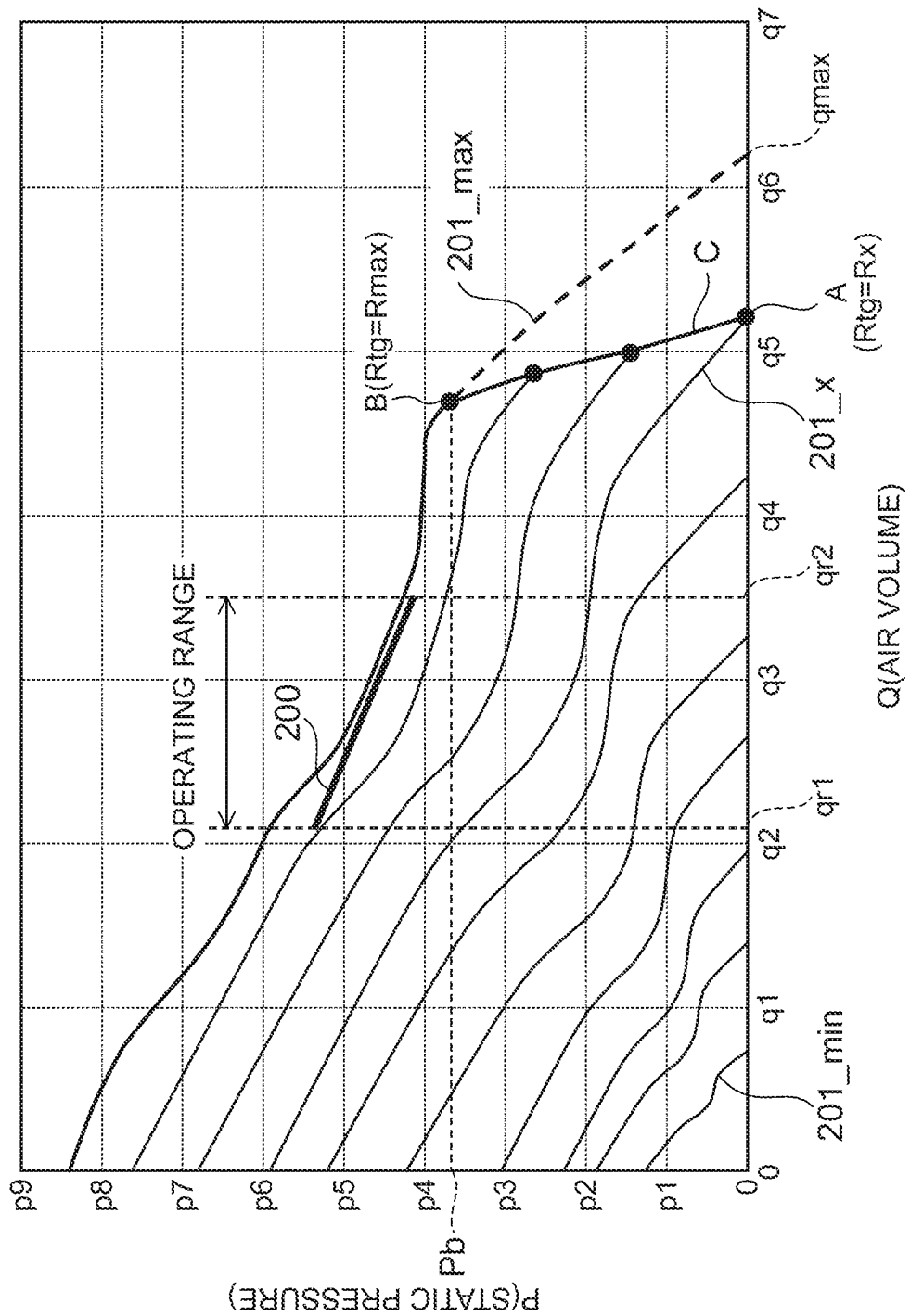
FIG. 2 is a view showing air volume control of the fan by a motor drive control device according to the first embodiment.

FIG. 2 is a view showing the air volume control of the fan 100 by the motor drive control device 1 according to the first embodiment.

In FIG. 2, the horizontal axis represents the air volume Q, and the vertical axis represents the static pressure P. FIG. 2 shows a P-Q curve for each target rotational speed Rtg when the target rotational speed Rtg indicated by the speed command signal Sc is changed.

In FIG. 2, reference sign 201_min represents a P-Q curve of the fan 100 when the target rotational speed Rtg is set to a minimum value Rmin, reference sign 201_max represents a P-Q curve of the fan 100 when the target rotational speed Rtg is set to a maximum value Rmax, and reference sign 201_x represents a P-Q curve when the target rotational speed Rtg is set to a value between the maximum value and the minimum value.

As described above, the fan is designed so that a desired air volume is obtained in a required operating range. For example, in FIG. 2, it is assumed that the operating range required for the fan is a range indicated by reference sign 200. In this case, the required operating range 200 exists in a region below the P-Q curve 201_max (region where the static pressure is lower) when the target rotational speed Rtg is set to the maximum value Rmax, so that it can be said that the fan having the P-Q curve shown in FIG. 2 satisfies a required specification.

On the other hand, as described above, for the fan, quietness is more important than air volume in a region other than the required operating range, that is, in a region where the static pressure is a predetermined value or less. For example, in FIG. 2, quietness is more important than air volume in a region where the static pressure is equal to Pb or less.

However, the conventional fan controls the rotational speed of the motor so that the rotational speed of the motor has reached the target rotational speed Rtg indicated by the speed command signal Sc, and the air volume changes due to a pressure loss (static pressure). Therefore, even in a region where the static pressure is low, the air volume trends to increase, and noise trends to intensify.

For example, a case where a conventional fan is designed to operate on a P-Q curve indicated by reference sign 201_max as shown in FIG. 2 is considered. In this case, when the target rotational speed Rtg is set to "Rtg_max" in a free air state, the conventional fan generates an air volume qmax that greatly exceeds the required operating range 200 (the range from qr1 to qr2 in air volume).

However, as described above, in a region other than the operating range 200, an air volume that greatly exceeds the required operating range 200 is not necessary.

Therefore, the motor drive control device 1 according to the first embodiment controls the rotational speed of the motor 20 so that the air volume of the fan 100 is limited regardless of the target rotational speed Rtg indicated by the speed command signal Sc in a region where the static pressure is lower than a predetermined value.

Specifically, as shown in FIG. 2, the motor drive control device 1 controls the motor 20 so that the air volume of the fan 100 changes along a line (hereinafter also referred to as "maximum air volume control line") C connecting a point A of the maximum air volume when the target rotational speed Rtg is set to a predetermined value Rx (minimum value Rmin<Rx<maximum value Rmax) and a point B of the maximum air volume when the target rotational speed Rtg is set to a maximum value Rmax in a range where the static pressure is lower than a predetermined value Pb.

More specifically, the motor drive control device 1 adjusts the rotational speed of the motor 20 based on the correspondence relationship between the rotational speed and the motor current of the motor 20 on the maximum air volume control line C, thereby causing the air volume of the fan 100 to change along the maximum air volume control line C in a region where the static pressure is lower than a predetermined value Pb.

Figure 3:
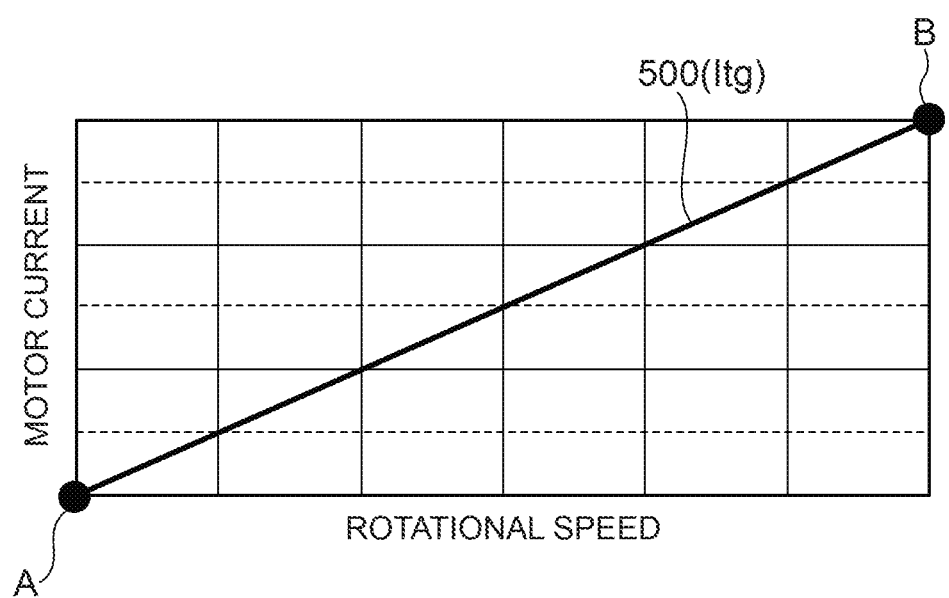
FIG. 3 is a view showing a correspondence relationship between a rotational speed and a motor current of a motor in a maximum air volume control line of FIG. 2.

FIG. 3 is a view showing a correspondence relationship between the rotational speed and the motor current of the motor 20 on the maximum air volume control line C in FIG. 2.

A characteristic (graph) 500 shown in FIG. 3 represents the relationship between the rotational speed (actual rotational speed Rr) and the motor current (actual current value Ir) of the motor 20 on the maximum air volume control line C of FIG. 2. A point A in the characteristic 500 in FIG. 3 corresponds to the point A on the maximum air volume control line C in FIG. 2, and a point B in the characteristic 500 in FIG. 3 corresponds to the point B on the maximum air volume control line C in FIG. 2.

The characteristic 500 can be acquired by the following method.

For example, the static pressure (P), the air volume (Q), the rotational speed (actual rotational speed Rr) and the motor current (actual current value Ir) of the motor 20 at each target rotational speed Rtg when the target rotational speed Rtg of the fan 100 (motor 20) is changed from a settable minimum value Rmin to a settable maximum value Rmax are measured in advance. Note that at this time, the maximum air volume control described later of the fan 100 is set to be disabled.

Next, the measurement data of the static pressure (P) and the air volume (Q) are used to draw a P-Q curve for each target rotational speed Rtg as shown in FIG. 2. Next, the drawn P-Q curve is used to set the maximum air volume control line C so that the air volume is limited in a region where the static pressure is lower than a desired value (for example, Pb). A method of setting the maximum air volume control line C is as described above.

Next, the measurement data of the actual rotational speed Rr and the actual current value Ir on the maximum air volume control line C are extracted from the measurement data of the actual rotational speed Rr and the actual current value Ir of the motor current of the motor 20 at each target rotational speed Rtg. Then, the correspondence relationship between the actual rotational speed Rr and the actual current value Ir is plotted based on the extracted measurement data. As a result, the characteristic 500 representing the correspondence relationship between the rotational speed and the motor current of the motor 20 can be obtained.

As described above, the characteristic 500 represents the relationship between the rotational speed and the motor current of the motor 20 when the air volume of the fan 100 changes along the maximum air volume control line C of the P-Q curve shown in FIG. 2. Accordingly, it is possible to cause the fan 100 to operate along the maximum air volume control line C by controlling the rotational speed and the motor current of the motor 20 so as to satisfy the characteristic 500.

Therefore, the motor drive control device 1 according to the first embodiment adjusts the rotational speed of the motor 20 so that the actual current value of the motor current of the motor 20 approaches a target value of the motor current represented by the characteristic 500 (hereinafter referred to as "target current value Itg"). As a result, the air volume of the fan 100 is changed along the maximum air volume control line C, thereby limiting the maximum air volume of the fan 100.

Hereinafter, a configuration of the motor drive control device 1 for realizing the function for limiting the maximum air volume of the fan 100 will be described in detail.

Figure 4:
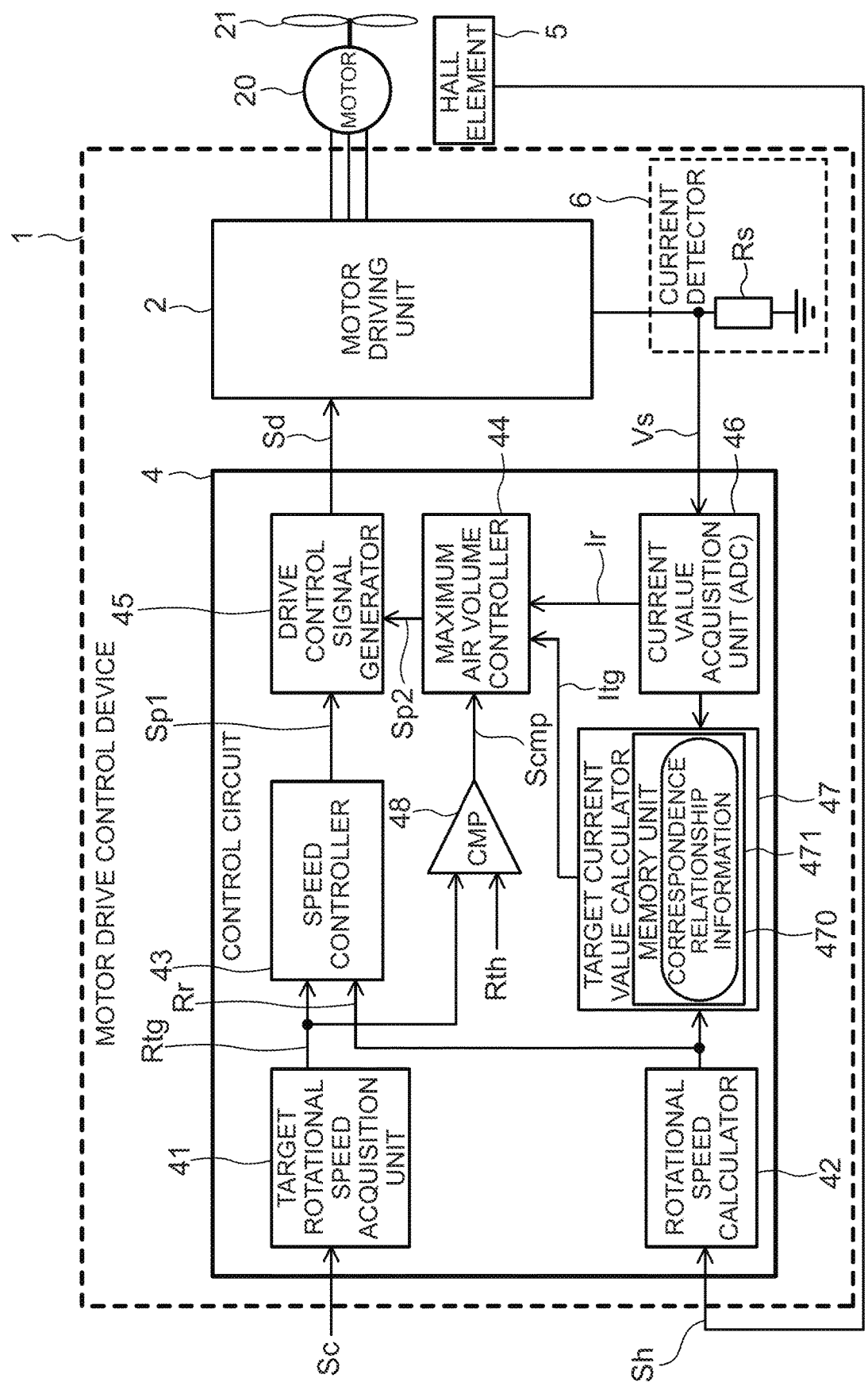
FIG. 4 is a block diagram showing a configuration of the motor drive control device according to the first embodiment.

FIG. 4 is a block diagram showing the configuration of the motor drive control device 1 according to the first embodiment.

FIG. 4 shows functional blocks related to the function for limiting the maximum air volume of the fan 100 described above out of functional blocks constituting the motor drive control device 1.

The control circuit 4 in the motor drive control device 1 performs speed feedback control when the target rotational speed Rtg of the motor 20 indicated by the speed command signal Sc is lower than the rotational speed threshold value Rth (for example, in the case of Rtg<Rth).

Here, the speed feedback control is control for generating the drive control signal Sd so that the rotational speed (actual rotational speed Rr) of the motor 20 coincides with the target rotational speed Rtg.

On the other hand, when the target rotational speed Rtg is higher than the rotational speed threshold value Rth (for example, in the case of Rtg Rth), the control circuit 4 generates the drive control signal Sd based on the relationship between the current (motor current) flowing through the motor 20 and the reference current value.

In the first embodiment, the reference current value is a target current value Itg to be calculated in association with the rotational speed (actual rotational speed) of the motor 20.

Specifically, when the target rotational speed Rtg is higher than the rotational speed threshold value Rth, the control circuit 4 performs maximum air volume control.

Here, the maximum air volume control according to the first embodiment is control for generating the drive control signal Sd so that the motor current approaches the target current value Itg.

More specifically, the control circuit 4 includes a target rotational speed acquisition unit 41, a rotational speed calculator 42, a speed controller 43, a maximum air volume controller 44, a drive control signal generator 45, a current value acquisition unit 46, a target current value calculator 47, and a comparator (CMP) 48 as functional blocks for implementing the speed feedback control and the maximum air volume control.

The target rotational speed acquisition unit 41 acquires information on the target rotational speed Rtg of the motor 20 from a speed command signal Sc which is output from, for example, a host device existing outside the motor drive control device 1, and provides the information to the speed controller 43 and the maximum air volume controller 44.

For example, when the speed command signal Sc is a PWM signal representing the target rotational speed Rtg by a duty ratio, the target rotational speed acquisition unit 41 analyzes the duty ratio of the PWM signal as the input speed command signal Sc to calculate the rotational speed corresponding to the duty ratio, and outputs the calculated rotational speed as the target rotational speed Rtg. For example, the target rotational speed acquisition unit 41 has a table representing the correspondence relationship between the duty ratio of the PWM signal and the target rotational speed. The target rotational speed acquisition unit 41 reads the target rotational speed Rtg corresponding to the duty ratio of the input speed command signal Sc from the table. As a result, the target rotational speed acquisition unit 41 can acquire the information on the target rotational speed Rtg from the speed command signal Sc.

The target rotational speed acquisition unit 41 is implemented, for example, by an external interface circuit, etc. of a microcontroller and program processing by CPU.

The rotational speed calculator 42 calculates the rotational speed (the number of revolutions per unit time) of the motor 20 based on the position detection signal Sh output from the position detection element 5. The rotational speed calculator 42 calculates the actual rotational speed of the rotor of the motor 20 by using the position detection signal Sh, and provides the calculated actual rotational speed as the actual rotational speed Rr to the speed controller 43 and the target current value calculator 47.

The rotational speed calculator 42 is implemented, for example, by an external interface circuit, etc. of a microcontroller and program processing of CPU like the target rotational speed acquisition unit 41.

The speed controller 43 generates a PWM command signal (an example of a first control signal) Sp1 indicating the duty ratio of the PWM signal as the drive control signal Sd based on the target rotational speed Rtg output from the target rotational speed acquisition unit 41 and the actual rotational speed Rr of the motor 20 calculated by the rotational speed calculator 42.

Specifically, the speed controller 43 generates the PWM command signal Sp1 so that the actual rotational speed Rr coincides with the target rotational speed Rtg. For example, the speed controller 43 calculates the difference between the actual rotational speed Rr and the target rotational speed Rtg, and calculates the duty ratio of the PWM signal as the drive control signal Sd so that the difference becomes zero. Then, the speed controller 43 outputs information of the calculated duty ratio as a PWM command signal Sp1.

The current value acquisition unit 46 is a functional unit for calculating the current value of the current flowing through the motor 20. The current value acquisition unit 46 includes, for example, an A/D conversion circuit for converting an analog signal into a digital signal. For example, the current value acquisition unit 46 is a $\Delta\Sigma$ modulation type analog/digital conversion circuit, and is configured by a dedicated logic circuit. The current value acquisition unit 46 converts an analog signal input from the current detector 6 into a digital signal according to a $\Delta\Sigma$ modulation method.

Here, as described above, the current detector 6 is a circuit for outputting a voltage Vs corresponding to the current (motor current) flowing through the motor 20 as a control target. For example, as shown in FIG. 4, the current detector 6 includes a resistor Rs which is connected in series between the coils Lu, Lv, and Lw of the motor 20 and the ground potential via the motor driving unit 2. The voltage Vs occurring between both ends of the resistor Rs is output as a detected value of the motor current of the motor 20.

The current value acquisition unit 46 converts the voltage Vs, which is an analog signal output from the current detector 6, into a digital signal, and outputs the digital signal as the actual current value Ir of the motor current of the motor 20.

The target current value calculator 47 calculates the target current value Itg based on the actual rotational speed Rr calculated by the rotational speed calculator 42. For example, the target current value calculator 47 includes a memory unit 470 for storing correspondence relationship information 471 representing the correspondence relationship between the rotational speed and the motor current of the motor 20, and uses the correspondence relationship information 471 read from the memory unit 470 to calculate the target current value Itg from the actual rotational speed Rr.

As described above, the target current value Itg is a target value of the motor current for controlling the air volume of the fan 100 along the maximum air volume control line C.

The correspondence relationship information 471 is, for example, information containing a mathematical expression representing the characteristic 500 in FIG. 3. For example, regression analysis is performed in advance by using measurement data of the actual rotational speed Rr and the actual current value Ir of the motor 20 on the maximum air volume control line C to derive a relational expression (for example, a linear function) of the rotational speed and the motor current, and the derived relational expression is stored as the correspondence relationship information 471 in advance in the memory unit 470.

In the maximum air volume control, the target current value calculator 47 reads out the relational expression of the rotational speed and the motor current as the correspondence relationship information 471 from the memory unit 470, and substitutes the actual rotational speed Rr of the motor 20 calculated by the rotational speed calculator 42 into the read-out relational expression to calculate the target current value Itg of the motor 20.

Note that the correspondence relationship information 471 is not limited to the above-described relational expression, and may be, for example, a table (lookup table) indicating the correspondence relationship between the motor current and the rotational speed.

The comparator 48 compares the target rotational speed Rtg with the rotational speed threshold value Rth, and outputs a comparison result.

The rotational speed threshold value Rth is a parameter serving as a reference for switching of the control mode (the speed feedback control and the maximum air volume control) of the fan 100. For example, when the fan 100 is controlled along the maximum air volume control line C shown in FIG. 2, the rotational speed of the motor 20 at the point A may be set as the rotational speed threshold value Rth.

When the target rotational speed Rtg output from the target rotational speed acquisition unit 41 is larger than the rotational speed threshold value Rth, the comparator 48 outputs, for example, a high-level determination signal Scmp. On the other hand, when the target rotational speed Rtg output from the target rotational speed acquisition unit 41 is smaller than the rotational speed threshold value Rth, the comparator 48 outputs, for example, a low-level determination signal Scmp.

Based on the determination signal Scmp of the comparator 48, the maximum air volume controller 44 generates a PWM command signal (an example of a second control signal) Sp2 indicating the duty ratio of the PWM signal as the drive control signal Sd. Specifically, when it is determined by the comparator 48 that the target rotational speed Rtg is higher than the rotational speed threshold value Rth, the maximum air volume controller 44 generates the PWM command signal Sp2 so that the actual current value Ir of the motor current approaches the target current value Itg. On the other hand, when it is determined by the comparator 48 that the target rotational speed Rtg is lower than the rotational speed threshold value Rth, the maximum air volume controller 44 does not generate the PWM command signal Sp2.

The maximum air volume controller 44 generates the PWM command signal Sp2 based on the target current value Itg calculated by the target current value calculator 47 and the actual current value Ir calculated by the current value acquisition unit 46.

Specifically, the maximum air volume controller 44 generates the PWM command signal Sp2 so that the actual rotational speed Rr of the motor 20 increases when the actual current value Ir is higher than the target current value Itg, and generates the PWM command signal Sp2 so that the actual rotational speed Rr of the motor 20 decreases when the actual current value Ir is lower than the target current value Itg.

More specifically, the maximum air volume controller 44 increases the rotational speed of the motor 20 when the actual current value Ir of the motor 20 is higher than a predetermined range containing the target current value Itg as a reference. The maximum air volume controller 44 does not change the rotational speed of the motor 20 when the actual current value Ir is within the predetermined range. The maximum air volume controller 44 generates the PWM command signal Sp2 so as to decrease the rotational speed of the motor when the actual current value Ir is lower than the predetermined range.

Figure 5A:
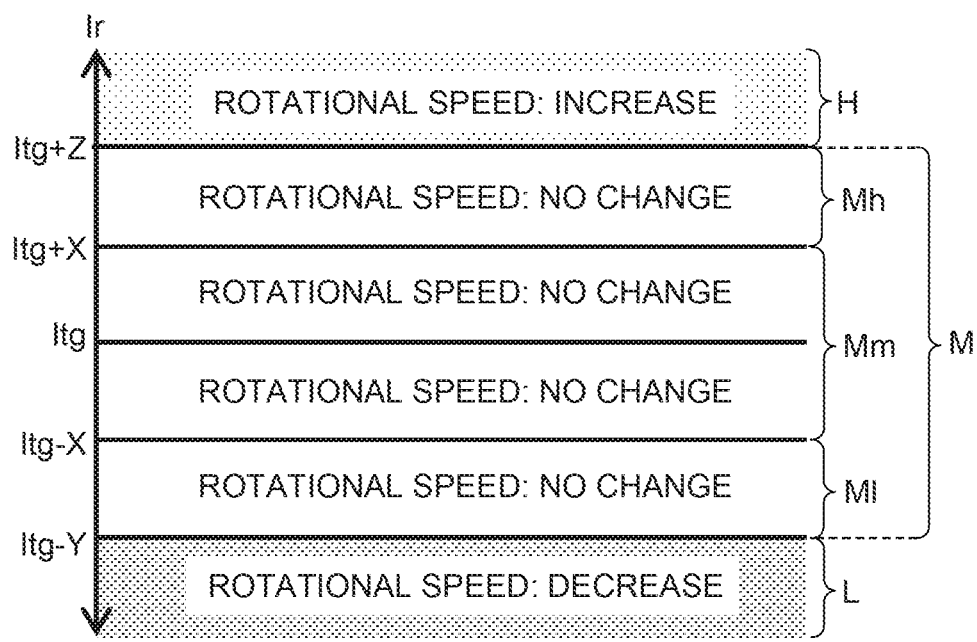
FIG. 5A is a view showing an example of a method for adjusting the rotational speed of the motor during maximum air volume control by the motor drive control device according to the first embodiment.
Figure 5B:
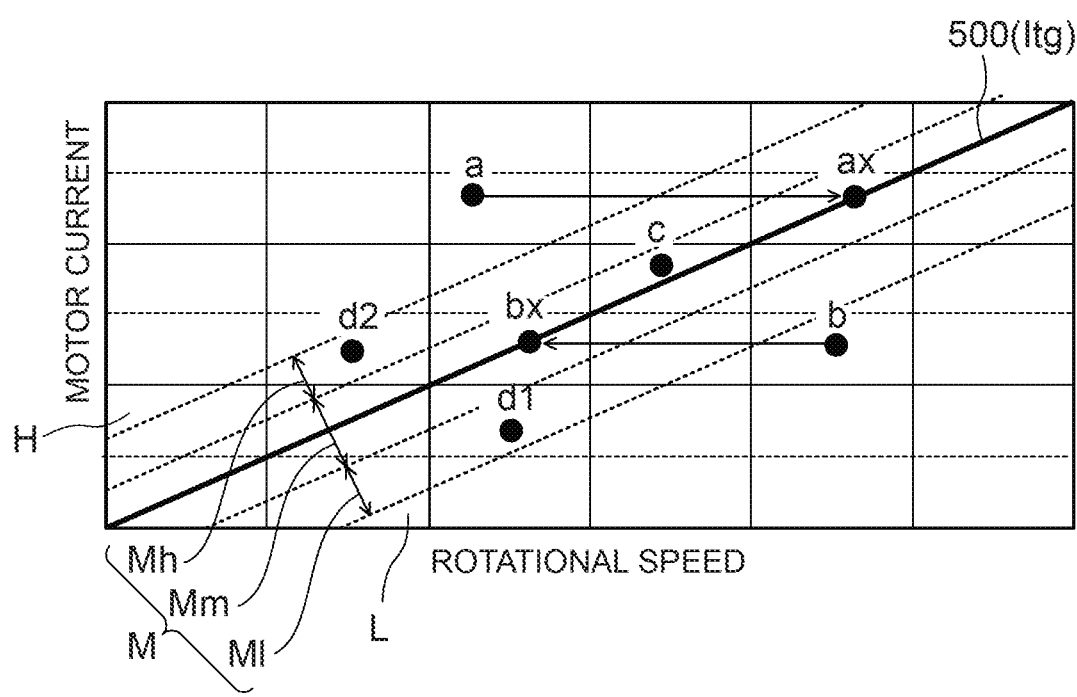
FIG. 5B is a view showing an example of a method for adjusting an operating point of the motor during maximum air volume control by the motor drive control device according to the first embodiment.

FIGS. 5A and 5B are views showing the maximum air volume control. FIG. 5A shows an example of a method for adjusting the rotational speed of the motor 20 based on the actual current value Ir of the motor current. FIG. 5B shows an example of a method for adjusting an operating point of the motor 20 based on the target current value Itg.

Note that |X|<|Y|, |Z| in FIG. 5A.

For example, as shown in FIG. 5A, in the case of Itg−X<Ir<Itg+X, that is, when the actual current value Ir of the motor current is within a range Mm, the maximum air volume controller 44 makes the rotational speed of the motor 20 unchanged. For example, when the motor 20 is operating at an operating point c in FIG. 5B, it can be determined that the operating point c is within the range Mm and the fan 100 is operating along the maximum air volume control line C. In this case, the maximum air volume controller 44 outputs a PWM command signal Sp2 containing information of the same duty ratio as a PWM command signal Sp2 output immediately before to make the rotational speed of the motor 20 unchanged.

On the other hand, in the case of Ir>Itg+Z, that is, when the actual current value Ir of the motor current is within a range H, the maximum air volume controller 44 generates the PWM command signal Sp2 so as to increase the rotational speed of the motor 20. For example, when the motor 20 is operating at an operating point "a" in FIG. 5B, it can be determined that the operating point a is within the range H and the fan 100 is not operating along the maximum air volume control line C (the pressure resistance against the fan 100 is large). In this case, as shown in FIG. 5B, the maximum air volume controller 44 generates the PWM command signal Sp2 for increasing the rotational speed of the motor 20 so as to shift the operating point of the fan 100 from "a" to "ax" on the characteristic 500. For example, when the duty ratio indicated by the PWM command signal Sp2 output immediately before is 50% and a unit adjustment width of the duty ratio is 0.1%, the maximum air volume controller 44 outputs a PWM command signal Sp2 indicating the duty ratio of "(50+0.1)%" to increase the rotational speed of the motor 20.

In the case of Ir<Itg−Y, that is, when the actual current value Ir of the motor current is within a range L, the maximum air volume controller 44 generates the PWM command signal Sp2 so as to reduce the rotational speed of the motor 20. For example, when the motor 20 is operating at an operating point b in FIG. 5B, it can be determined that the operating point b is within the range L, and the fan 100 is not operating along the maximum air volume control line C (the pressure resistance against the fan 100 is small). In this case, as shown in FIG. 5B, the maximum air volume controller 44 generates a PWM command signal Sp2 for reducing the rotational speed of the motor 20 so as to shift the operating point of the fan 100 from "b" to "bx" on the characteristic 500. For example, when the duty ratio indicated by the PWM command signal Sp2 output immediately before is 50% and the unit adjustment width of the duty ratio is 0.1%, the maximum air volume controller 44 outputs a PWM command signal Sp2 indicating the duty ratio of "(50−0.1)%" to reduce the rotational speed of the motor 20.

Note that as shown in FIG. 5A, the maximum air volume controller 44 may perform control so as to make the rotational speed of the motor 20 unchanged in the range Mh of Itg+X<Ir<Itg+Z and the range Ml of Itg−Y<Ir<Itg−X as in the case of the range Mm of Itg−X<Ir<Itg+X. As a result, in the maximum air volume control, the range of the operating point of the motor 20 for making the rotational speed unchanged can be expanded from the range Mm to the range M(=Mh+Mm+Ml). Note that |Y|=|Z| or |Y|≠|Z| may be set.

The drive control signal generator 45 is a functional unit for generating a drive control signal Sd for controlling the driving of the motor 20. The drive control signal generator 45 generates the drive control signal Sd based on the PWM command signal Sp1 output from the speed controller 43 and the PWM command signal Sp2 output from the maximum air volume controller 44.

Specifically, when it is determined by the comparator 48 that the target rotational speed Rtg is smaller than the rotational speed threshold value Rth, the drive control signal generator 45 generates a PWM signal having a duty ratio indicated by the PWM command signal Sp1 output from the speed controller 43, and outputs the generated PWM signal as the drive control signal Sd. On the other hand, when it is determined by the comparator 48 that the target rotational speed Rtg is larger than the rotational speed threshold value Rth, the drive control signal generator 45 generates a PWM signal having a duty ratio indicated by the PWM command signal Sp2 output from the maximum air volume controller 44, and outputs the generated PWM signal as the drive control signal Sd.

For example, when the PWM command signal Sp2 is not output from the maximum air volume controller 44, the drive control signal generator 45 generates a PWM signal having a duty ratio indicated by the PWM command signal Sp1 output from the speed controller 43, and outputs the generated PWM signal as the drive control signal Sd. When the PWM command signal Sp2 is output from the maximum air volume controller 44, the drive control signal generator 45 generates a PWM signal having a duty ratio which is indicated, not by the PWM command signal Sp1, but by the PWM command signal Sp2 output from the maximum air volume controller 44, and outputs the generated PWM signal as the drive control signal Sd.

The speed controller 43, the maximum air volume controller 44, the drive control signal generator 45, the target current value calculator 47, and the comparator 48 described above are implemented by, for example, program processing of a microcontroller (CPU). Note that the drive control signal generator 45 may be implemented by a dedicated logic circuit.

Next, a flow of the air volume control method of the fan 100 will be described.

Figure 6:
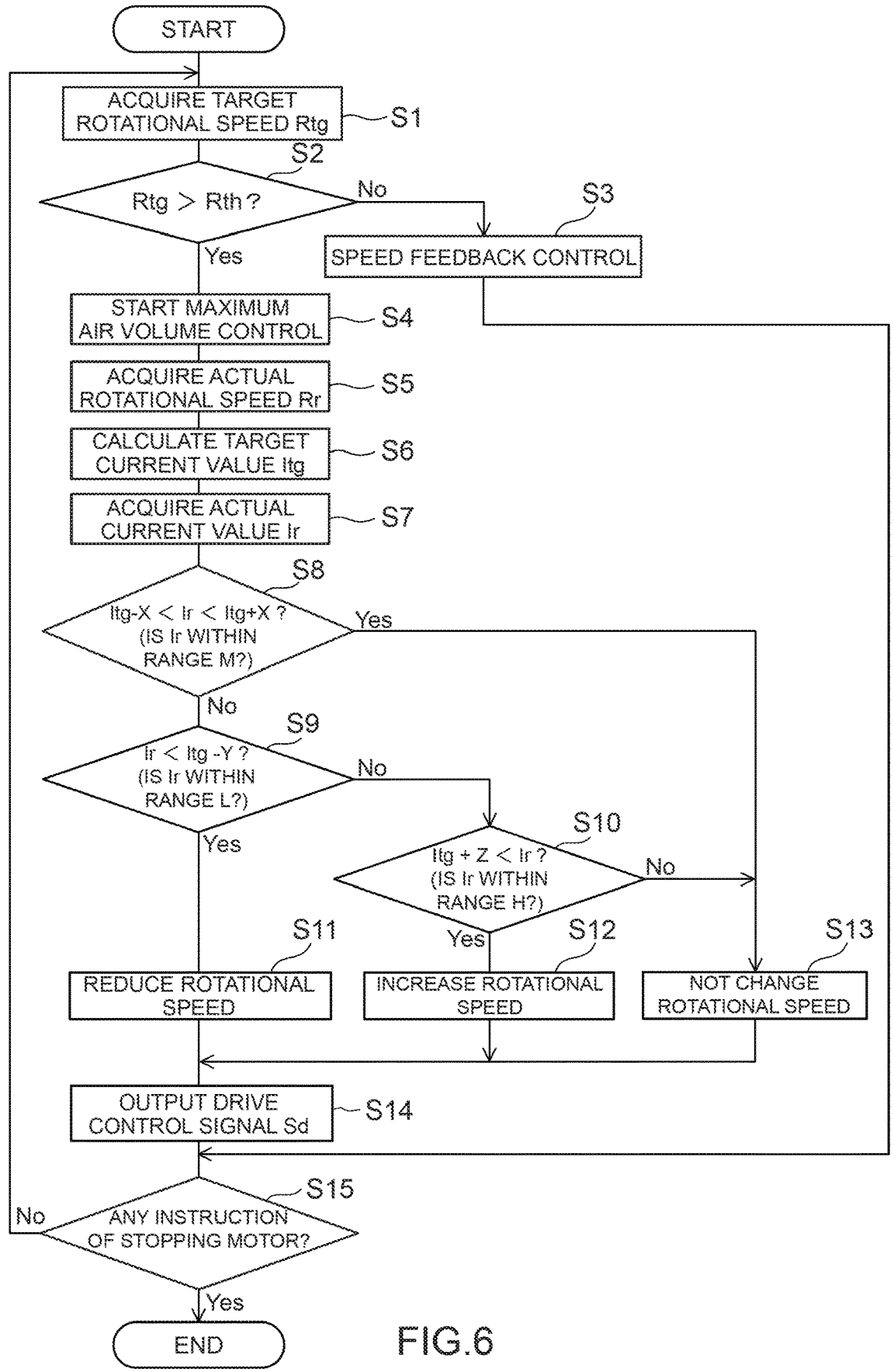
FIG. 6 is a flowchart showing a flow of the air volume control of the fan by the motor drive control device according to the first embodiment.

FIG. 6 is a flowchart showing the flow of air volume control of the fan 100 by the motor drive control device 1 according to the first embodiment.

First, when a speed command signal Sc is input from the host device to the control circuit 4, the target rotational speed acquisition unit 41 of the control circuit 4 acquires information on the target rotational speed Rtg from the speed command signal Sc (step S1).

Next, the control circuit 4 determines via the comparator 48 whether the target rotational speed Rtg acquired in step S1 is larger than the rotational speed threshold value Rth (step S2). When the target rotational speed Rtg is smaller than the rotational speed threshold value Rth (step S2: No), the control circuit 4 performs the speed feedback control (step S3). In other words, as described above, the drive control signal generator 45 generates the drive control signal Sd based on the PWM command signal Sp1 generated by the speed controller 43, whereby the motor 20 operates so that the actual rotational speed Rr of the motor 20 coincides with the target rotational speed Rtg. Note that at this time, the maximum air volume controller 44 does not generate the PWM command signal Sp2.

On the other hand, when the target rotational speed Rtg is larger than the rotational speed threshold value Rth in step S2 (step S2: Yes), the control circuit 4 starts the maximum air volume control (step S4).

In the maximum air volume control, the control circuit 4 first acquires information on the actual rotational speed Rr of the motor 20 (step S5). In other words, as described above, the target current value calculator 47 acquires information on the actual rotational speed Rr of the motor 20 calculated by the rotational speed calculator 42.

Next, the target current value calculator 47 calculates the target current value Itg (step S6). Specifically, the target current value calculator 47 calculates the target current value Itg by the above-described method based on the information on the actual rotational speed Rr acquired in step S5 and the correspondence relationship information 471 stored in the memory unit 470.

Next, the maximum air volume controller 44 acquires the actual current value Ir of the motor 20 (step S7). Specifically, as described above, the maximum air volume controller 44 acquires information on the actual current value Ir of the motor current calculated by the current value acquisition unit 46.

Next, the maximum air volume controller 44 determines whether Itg−X<Ir<Itg+X is satisfied, that is, whether the actual current value Ir acquired in step S7 is within the range M (step S8).

In step S8, when the actual current value Ir is within the range M (step S8: Yes), the maximum air volume controller 44 makes the rotational speed of the motor 20 unchanged (step S13). For example, the maximum air volume controller 44 outputs a PWM command signal Sp2 indicating the same duty ratio as a PWM command signal Sp2 output immediately before.

On the other hand, when the actual current value Ir is not within the range M in step S8 (step S8: No), the maximum air volume controller 44 determines whether Ir<Itg−Y is satisfied, that is, whether the actual current value Ir is within the range L (step S9).

In step S9, when the actual current value Ir is within the range L (step S9: Yes), the maximum air volume controller 44 reduces the rotational speed of the motor 20 (step S11). For example, the maximum air volume controller 44 outputs a PWM command signal Sp2 indicating a duty ratio which is increased by only a predetermined width (for example, 0.1%) from the duty ratio indicated by a PWM command signal Sp2 output immediately before.

On the other hand, when the actual current value Ir is not within the range L in step S9 (step S9: No), the maximum air volume controller 44 determines whether Itg+Z<Ir is satisfied, that is, whether the actual current value Ir is within the range H (step S10).

In step S10, when the actual current value Ir is within the range H (step S10: Yes), the maximum air volume controller 44 increases the rotational speed of the motor 20 (step S12). For example, the maximum air volume controller 44 outputs a PWM command signal Sp2 indicating a duty ratio which is reduced by only a predetermined width (for example, 0.1%) from a duty ratio indicated by a PWM command signal Sp2 output immediately before.

On the other hand, when the actual current value Ir is not within the range H in step S10 (step S10: No), the maximum air volume controller 44 determines that Itg+X<Ir<Itg+Z or Itg−X<Ir<Itg−Y is satisfied, that is, Itg is within the range Mh or Ml, and makes the rotational speed of the motor 20 unchanged (step S13).

After steps S11 to S13, the control circuit 4 generates the drive control signal Sd based on the PWM command signal Sp2 (step S14). Specifically, the drive control signal generator 45 generates a PWM signal having a duty ratio indicated by a PWM command signal Sp2 output from the maximum air volume controller 44 in steps S11 to S13, and outputs the generated PWM signal as the drive control signal Sd.

After steps S3 and S14, the control circuit 4 determines whether an instruction to stop the motor 20 is given (step S15). In step S15, when no instruction to stop the motor 20 is given (step S15: No), the above-described processing (S1 to S15) is repeatedly executed. On the other hand, when an instruction to stop the motor 20 is received in step S15 (step S15: Yes), the control circuit 4 finishes the air volume control processing.

Figure 7:
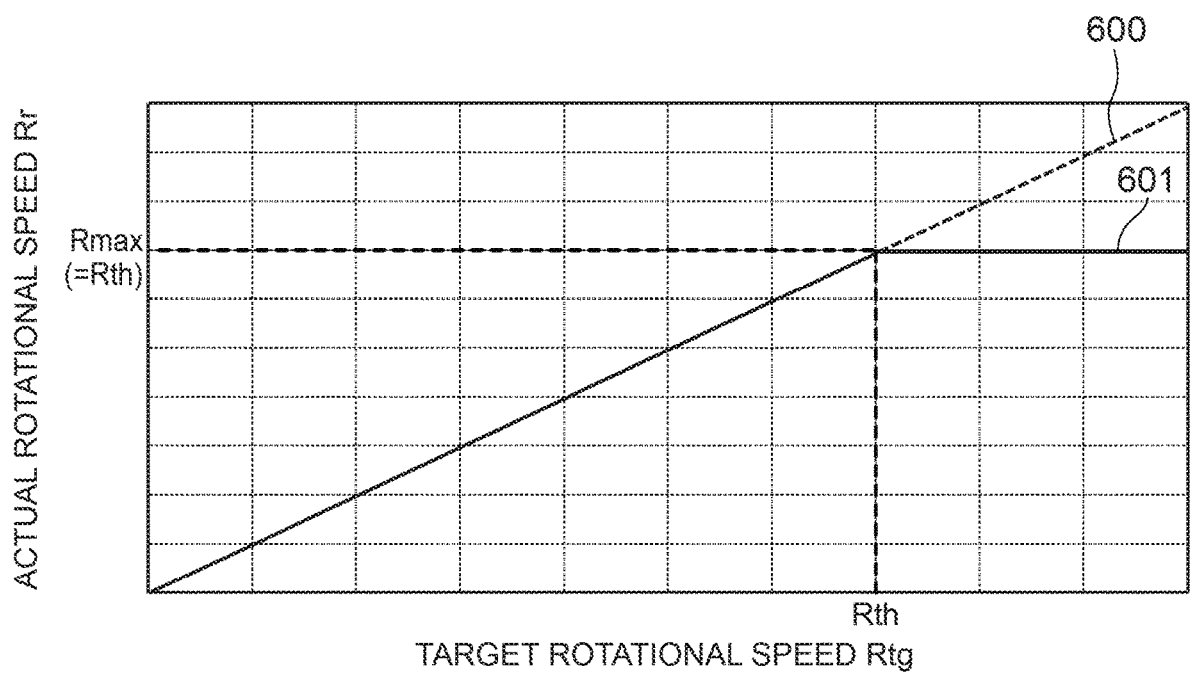
FIG. 7 is a view showing a relationship between the rotational speed of the motor and a target rotational speed in the fan according to the first embodiment.

FIG. 7 is a view showing the relationship between the rotational speed of the motor and the target rotational speed in the fan according to the first embodiment.

In FIG. 7, the horizontal axis represents the target rotational speed Rtg, and the vertical axis represents the actual rotational speed Rr of the motor 20.

As shown in FIG. 7, the conventional fan controls the motor so that the rotational speed (actual rotational speed Rr) coincides with the target rotational speed Rtg as indicated by reference sign 600. In other words, since the conventional fan controls the motor so that the air volume increases in proportion to the target rotational speed Rtg, the air volume increases in proportion to the target rotational speed Rtg even in a region where the static pressure (pressure resistance) is low, for example, like a P-Q curve indicated by reference sign 201_max in FIG. 2.

On the other hand, the fan 100 according to the first embodiment controls the motor 20 so that the rotational speed of the fan (motor) coincides with the target rotational speed Rtg in a range where the target rotational speed Rtg is lower than the rotational speed threshold value Rth as in the case of the conventional fan, but controls the motor 20 so that the rotational speed does not exceed a set maximum rotational speed, that is, the rotational speed threshold value Rth regardless of the target rotational speed Rtg as indicated by reference sign 601 in a range where the target rotational speed Rtg is higher than the rotational speed threshold value Rth.

In other words, according to the fan 100 of the first embodiment, in the range where the target rotational speed Rtg is higher than the rotational speed threshold value Rth, the motor drive control device 1 calculates the target current value Itg corresponding to the actual rotational speed of the motor 20 from the relationship between the rotational speed and the motor current on the maximum air volume control line C shown in FIG. 2, and controls the rotational speed of the motor 20 so that the motor current approaches the target current value Itg as described above. As a result, the fan 100 can limit the maximum air volume in the region where the static pressure is low (a range where the static pressure in the P-Q curves in FIG. 2 is lower than Pb).

As described above, when the target rotational speed Rtg indicated by the speed command signal Sc is lower than the rotational speed threshold value Rth, the motor drive control device 1 according to the first embodiment performs the speed feedback control for generating the drive control signal Sd so that the rotational speed of the motor 20 coincides with the target rotational speed Rtg, but when the target rotational speed Rtg is higher than the rotational speed threshold value Rth, the motor drive control device 1 generates the drive control signal Sd based on the relationship between the motor current and the reference current value. Specifically, when the target rotational speed Rtg is higher than the rotational speed threshold value Rth, the motor drive control device 1 performs the maximum air volume control for generating the drive control signal Sd so that the actual current value Ir of the motor 20 approaches the target current value Itg calculated in association with the rotational speed of the motor 20.

According to this control method, as described above, in the range where the target rotational speed Rtg is lower than the rotational speed threshold value Rth, the motor 20 is driven such that the air volume of the fan 100 increases in proportion to the indicated target rotational speed Rtg, whereas in the range where the target rotational speed Rtg is higher than the rotational speed threshold value Rth, the motor 20 is driven such that the air volume of the fan 100 changes according to the static pressure.

Note that the maximum air volume control by the motor drive control device 1 performs such control that when the target rotational speed Rtg is higher than the rotational speed threshold value Rth, the maximum air volume is equal to a desired value according to the relationship between the rotational speed of the motor 20 and the pressure loss, and it does not necessarily perform such control as to keep the air volume constant. Therefore, this maximum air volume control differs from conventional so-called constant air volume control in the control method and its effect.

Furthermore, as described above, in the range where the target rotational speed Rtg is higher than the rotational speed threshold value Rth, the motor drive control device 1 calculates the target current value Itg corresponding to the actual rotational speed Rr of the motor 20 calculated based on the position detection signal (Hall signal) Sh of the motor 20 by using the pre-stored correspondence relationship information 471 between the rotational speed of the motor 20 and the target current value Itg, and controls the rotational speed of the motor 20 so that the actual current value Ir of the motor 20 approaches the target current value Itg.

Here, by setting the correspondence relationship information 471 as information indicating the relationship between the rotational speed of the motor 20 and the target current value Itg in a region where the static pressure of the fan 100 is lower than a predetermined value, the rotational speed of the motor 20 is controlled so that the relationship between the rotational speed of the motor 20 and the target current value Itg specified in the correspondence relationship information 471 is satisfied regardless of the indicated target rotational speed Rtg in the region where the static pressure of the fan 100 is lower than the predetermined value. For example, by setting the correspondence relationship information 471 so as to satisfy the characteristics on the maximum air volume control line C in the P-Q curves shown in FIG. 2, the air volume can be controlled so as to satisfy the maximum air volume control line C regardless of the indicated target rotational speed Rtg in the region where the static pressure of the fan 100 is lower than Pb.

In other words, according to the motor drive control device 1 of the first embodiment, in a region where the static pressure is higher than the predetermined value, a sufficient air volume can be secured in a required operating range, and in a region where the static pressure is lower than the predetermined value, the air volume is suppressed regardless of the indicated target rotational speed Rtg, so that occurrence of noise and increase in power consumption of the fan 100 can be suppressed.

Under the maximum air volume control, the motor drive control device 1 generates the drive control signal Sd so that the rotational speed of the motor 20 increases when the actual current value Ir of the motor 20 is higher than the target current value Itg, and generates the drive control signal Sd so that the rotational speed of the motor 20 decreases when the actual current value Ir of the motor 20 is lower than the target current value Itg.

According to this control method, when the indicated target rotational speed Rtg is higher than the rotational speed threshold value Rth, the operating points of the motor 20 can be easily controlled so that the actual current value Ir and the actual rotational speed Rr of the motor 20 satisfy the characteristic 500 as shown in FIG. 5B.

Furthermore, under the maximum air volume control, the motor drive control device 1 generates the drive control signal Sd so as to increase the rotational speed of the motor 20 when the actual current value Ir of the motor 20 is higher than the range Mm containing the target current value Itg as a reference, makes the rotational speed of the motor 20 unchanged when the actual current value Ir of the motor 20 is within the range Mm, and reduce the rotational speed of the motor 20 when the actual current value Ir of the motor 20 is lower than the range Mm.

According to this control method, it is possible to prevent the air volume of the fan 100 from becoming unstable due to excessive change of the rotational speed in the situation where the operating point of the motor 20 approaches the maximum air volume control line C.

Particularly, as shown in FIG. 5A and FIG. 5B, in the maximum air flow control, the range of the operating point in which the rotational speed of the motor 20 is made unchanged is expanded from the range Mm to the range M (=Mh+Mm+Ml), whereby it is possible to more effectively prevent the excessive change of the rotational speed, and thus further stabilize the air volume of the fan 100.

Second Embodiment

Figure 8:
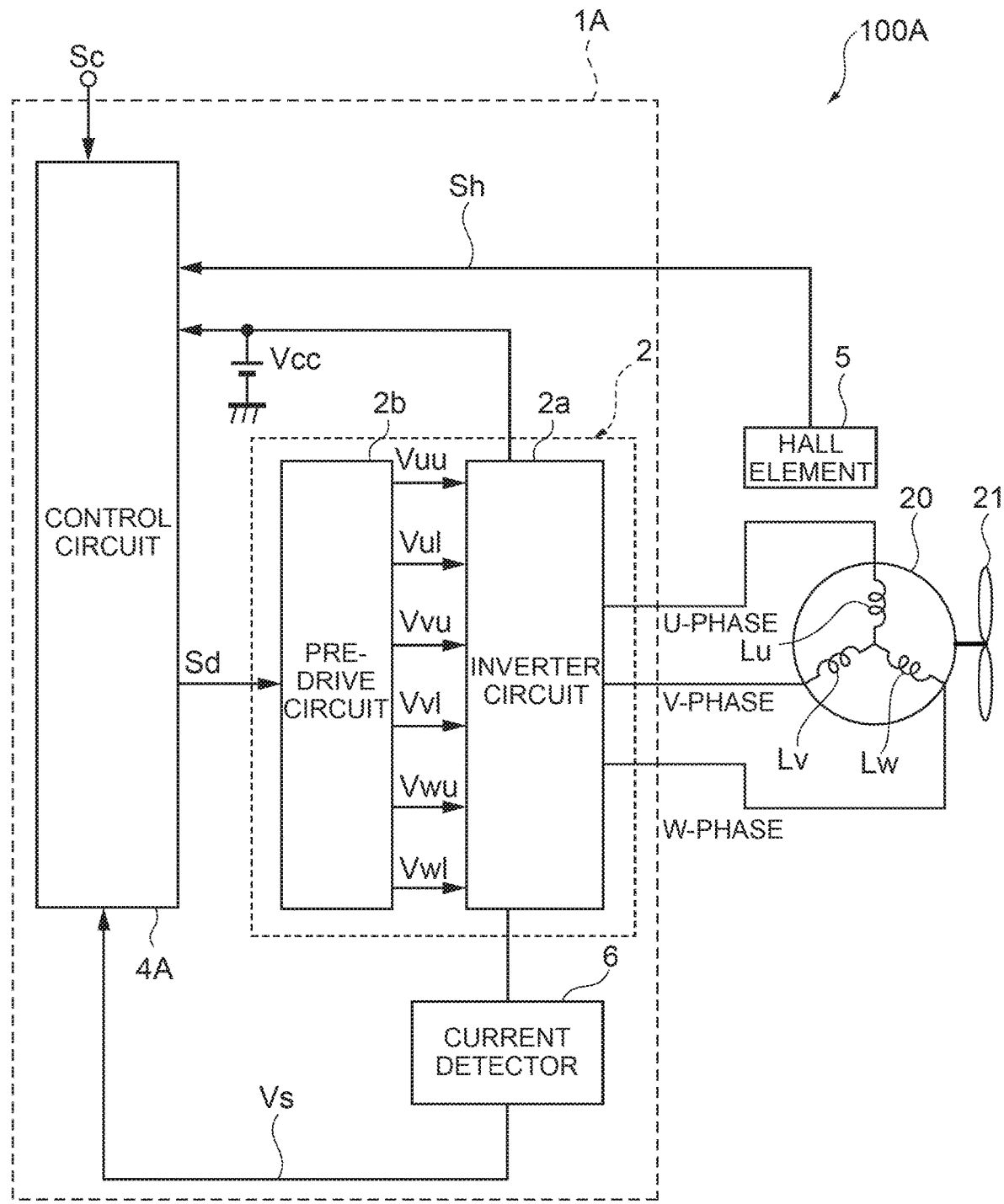
FIG. 8 is a block diagram showing a configuration of a fan according to a second embodiment of the present disclosure.

FIG. 8 is a block diagram showing a configuration of a fan according to a second embodiment of the disclosure.

Like the fan 100 according to the first embodiment, a fan 100A according to the second embodiment includes a motor 20, a motor drive control device 1A for controlling driving of the motor 20, and an impeller 21 which is configured to be rotatable by rotational force of the motor 20.

The motor drive control device 1A according to the second embodiment performs air volume control of the fan 100A by a method different from that of the motor drive control device 1 according to the first embodiment.

Specifically, the motor drive control device 1A includes a motor driving unit 2, a control circuit 4A, and a current detector 6. The components of the motor drive control device 1A shown in FIG. 8 are a part of the whole of the motor drive control device 1A, and the motor drive control device 1A may include other components in addition to those shown in FIG. 8.

In the second embodiment, at least a part of the motor drive control device 1A is packaged as one semiconductor device (IC: Integrated Circuit). For example, circuits such as the control circuit 4A and the motor driving unit 2 are implemented as separate semiconductor devices, respectively.

Note that the motor drive control device 1A may be a semiconductor device packaged in its entirety, or the whole or a part of the motor drive control device 1A and other devices may be packaged together to configure a single semiconductor device.

The control circuit 4A is configured by a microcomputer, a digital circuit, an analog circuit, and the like, for example, like the control circuit 4 according to the first embodiment. Various signals for instructing driving of the motor 20 are input to the control circuit 4A. The control circuit 4A performs drive control of the motor 20 based on these signals. For example, a speed command signal Sc is input as a signal for instructing driving of the motor 20 to the control circuit 4A from a device provided outside the control circuit 4A such as a host device.

The control circuit 4A obtains information on the actual rotational speed of the rotor of the motor 20 from a position detection signal Sh, and controls the driving of the motor 20.

Note that FIG. 8 illustrates a case where one Hall element 5 is arranged in the fan 100A, but the number of Hall elements 5 to be arranged in the fan 100A is not particularly limited. For example, three Hall elements 5 may be arranged around the rotor of the motor 20 at substantially equal intervals.

The control circuit 4A may be configured so that other information related to the rotation state of the motor 20 is input to the control circuit 4A in addition to the position detection signal Sh or in place of the position detection signal Sh like the control circuit 4 according to the first embodiment.

The control circuit 4A generates a drive control signal Sd (for example, a PWM signal) for controlling the rotational speed of the motor 20 based on the speed command signal Sc, the position detection signal Sh, the voltage Vs described above, and the like.

Like the control circuit 4 according to the first embodiment, the control circuit 4A supplies the motor driving unit 2 with a drive control signal Sd which is a PWM (pulse width modulation) signal to adjust the rotational speed of the motor 20 while switching, in a predetermined order, an energized phase among the coils Lu, Lv, Lw of plural phases to be energized by the motor driving unit 2, thereby controlling the air volume of the fan 100A.

The motor drive control device 1A according to the second embodiment controls the rotational speed of the motor 20 so that the air volume of the fan 100A is limited in a region where the static pressure of the fan 100A is not more than a predetermined value.

Figure 9:
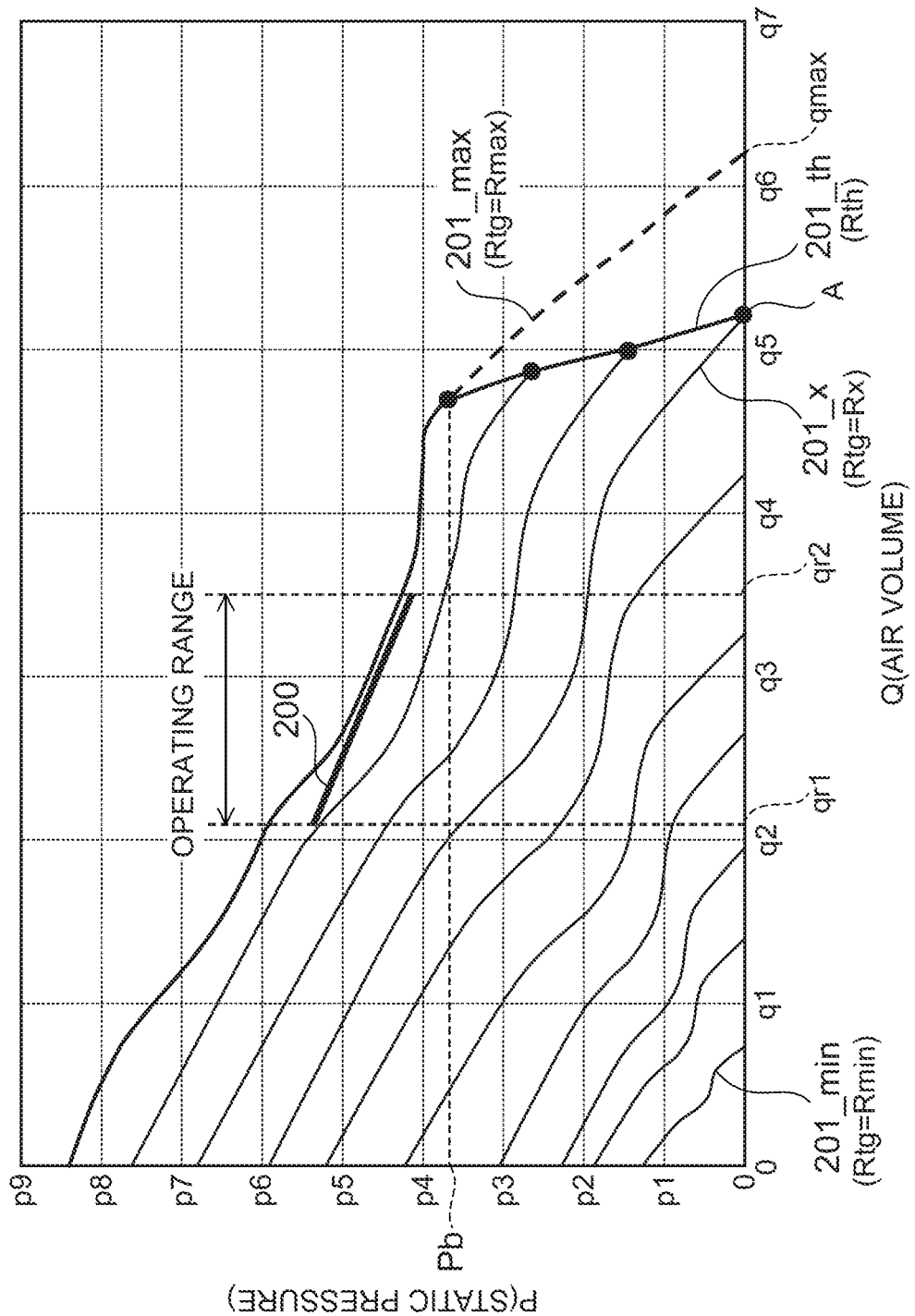
FIG. 9 is a view showing air volume control of the fan by a motor drive control device according to the second embodiment.

FIG. 9 is a view showing the air volume control of the fan 100A by the motor drive control device 1A according to the second embodiment.

In FIG. 9, the horizontal axis represents the air volume Q, and the vertical axis represents the static pressure P. FIG. 9 shows a P-Q curve for each target rotational speed Rtg of the fan when the target rotational speed Rtg indicated by the speed command signal Sc is changed.

In FIG. 9, reference sign 201_min represents a P-Q curve of the fan when the target rotational speed Rtg is set to the minimum value Rmin, and reference sign 201_max represents a P-Q curve of the fan when the target rotational speed Rtg is set to the maximum value Rmax, and reference sign 201_x represents a P-Q curve when the target rotational speed Rtg is set to a value Rx between the maximum value Rmax and the minimum value Rmin.

As described above, the fan is designed so that a desired air volume can be obtained in a required operating range 200, and quietness is more important than air volume in a region other than the required operating range 200, that is, in a region where the static pressure is not more than a predetermined value. For example, in FIG. 9, quietness is more important than air volume in a region where the static pressure is not more than Pb.

However, since the conventional fan controls the rotational speed of the motor so that the rotational speed has reached the target rotational speed indicated by the speed command signal Sc, the air volume trends increase to be more than necessary and noise trends to intensify even in a region where the static pressure is low like a free air state.

For example, a case where the conventional fan is designed to operate on the P-Q curve 201_max as shown in FIG. 9 is considered. In this case, when the target rotational speed Rtg is set to "Rtg_max" in the free air state, the conventional fan generates an air volume qmax which greatly exceeds an air volume range from qr1 to qr2 which is required in the operating range 200. However, as described above, in a region other than the operating range 200, an air volume that greatly exceeds the required air volume range from qr1 to qr2 is unnecessary.

Therefore, the motor drive control device 1A according to the second embodiment controls the rotational speed of the motor 20 so that the air volume of the fan 100A is limited regardless of the target rotational speed Rtg indicated by the speed command signal Sc in the region where the static pressure is lower than the predetermined value.

Specifically, as shown in FIG. 9, in the range where the static pressure is lower than the predetermined value Pb, the motor drive control device 1A limits the actual rotational speed Rr of the motor 20 so that the actual rotational speed Rr of the motor 20 does not exceed the rotational speed threshold value Rth (Rmin<Rth<Rmax). For example, when the rotational speed threshold value Rth=Rx is set, the motor drive control device 1A controls the motor 20 so that the motor 20 rotates at a constant rotational speed Rx(Rth) in a range where the target rotational speed Rtg is higher than the rotational speed threshold value Rth and the static pressure is lower than the predetermined value Pb. Accordingly, the fan 100A operates to draw, not the P-Q curve 201_max, but the P-Q curve 201_th. As a result, in the region where the target rotational speed Rtg is higher than the rotational speed threshold value Rth and the static pressure is lower than a predetermined value, the air volume of the fan 100A is limited regardless of the target rotational speed Rtg indicated by the speed command signal Sc.

Figure 10:
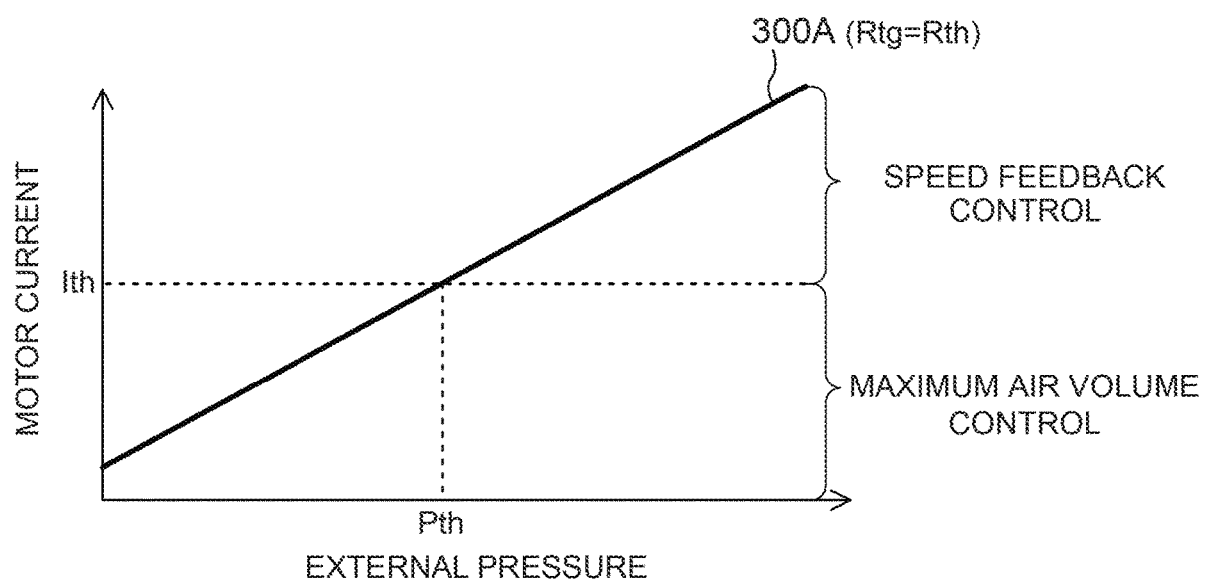
FIG. 10 is a view showing an outline of an air volume control method by the motor drive control device according to the second embodiment.

FIG. 10 is a view showing an outline of an air volume control method by the motor drive control device 1A according to the second embodiment.

In FIG. 10, the horizontal axis represents external pressure (pressure resistance, static pressure) applied to the fan, and the vertical axis represents a motor current. A characteristic (graph) 300A shown in FIG. 10 represents the relationship between the motor current and the external pressure when the target rotational speed Rtg of the fan is set to a predetermined value (for example, a maximum value Rmax).

As shown in FIG. 10, when the external pressure increases while the fan is rotating at a constant rotational speed, the motor current also increases. In other words, the motor current and the external pressure are in a substantially proportional relationship in the fan. Accordingly, it is possible to estimate the external pressure applied to the fan by monitoring the motor current.

Therefore, in the fan 100A according to the second embodiment, a current threshold value Ith is preset as a current reference value for determining whether the external pressure is in a high state or in a low state in order to limit the air volume under a state where the external pressure (static pressure) is lower than a predetermined value. By comparing the current threshold Ith with the motor current of the motor 20, the fan 100A estimate whether the external pressure is in a high state or not, and switches the motor control method.

In the second embodiment, the reference current value is a current threshold value Ith for estimating the external pressure.

Specifically, when the target rotational speed Rtg indicated by the speed command signal Sc is lower than the rotational speed threshold value Rth, the motor drive control device 1A performs the speed feedback control for generating the drive control signal Sd so that the rotational speed of the motor 20 coincides with the target rotational speed Rtg. On the other hand, when the target rotational speed Rtg is higher than the rotational speed threshold value Rth, the motor drive control device 1A generates the drive control signal Sd based on the relationship between the current (motor current) flowing through the motor 20 and the reference current value (current threshold Ith).

More specifically, when the target rotational speed Rtg is higher than the rotational speed threshold value Rth, based on a comparison result between the actual current value Ir of the motor current and the current threshold value Ith, the motor drive control device 1A performs the switching between the speed feedback control and the maximum air volume control for generating the drive control signal Sd so that the rotational speed of the motor 20 does not exceed the rotational speed threshold value Rth as shown in FIG. 10.

Hereinafter, a configuration of the motor drive control device 1A for implementing the function for limiting the maximum air volume of the fan 100A will be described in detail.

Figure 11:
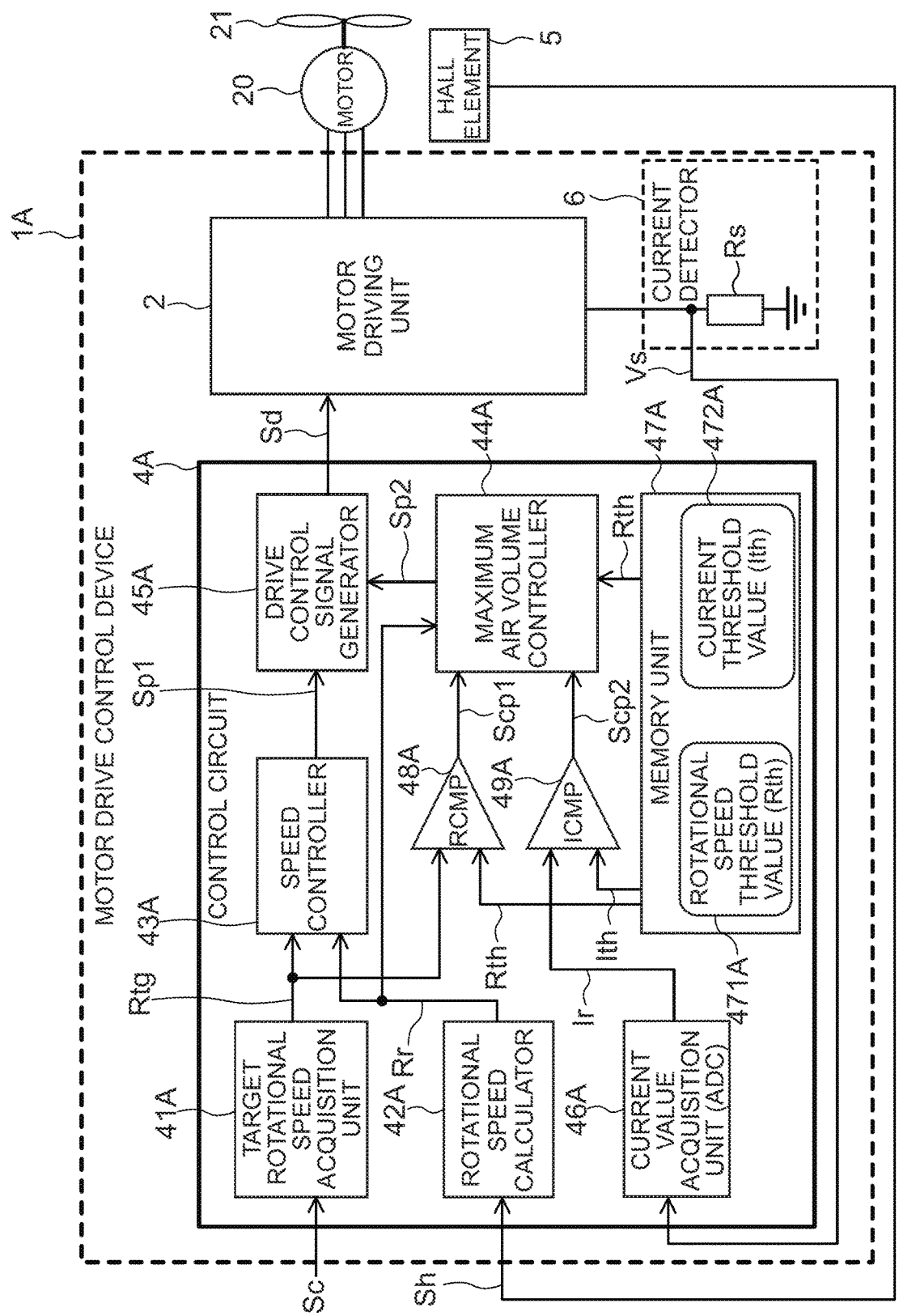
FIG. 11 is a block diagram showing a configuration of the motor drive control device according to the second embodiment.

FIG. 11 is a block diagram showing the configuration of the motor drive control device 1A according to the second embodiment.

FIG. 11 shows functional blocks related to the function for limiting the maximum air volume of the fan 100A described above among the functional blocks constituting the motor drive control device 1A.

When the target rotational speed Rtg of the motor 20 indicated by the speed command signal Sc is lower than the rotational speed threshold value Rth (for example, in the case of Rtg<Rth), the control circuit 4A in the motor drive control device 1A performs the speed feedback control.

As described above, the speed feedback control is the control for generating the drive control signal Sd so that the rotational speed (actual rotational speed Rr) of the motor 20 coincides with the target rotational speed Rtg.

Furthermore, when the target rotational speed Rtg is higher than or equal to the rotational speed threshold value Rth (for example, in the case of Rtg>or=Rth), the control circuit 4A switches the maximum air volume control and the speed feedback control with each other based on the comparison result of the motor current (actual current value Ir) of the motor 20 and the current threshold value Ith (reference current value).

Here, the maximum air volume control in the second embodiment is the control for generating the drive control signal Sd so that the rotational speed of the motor 20 does not exceed the rotational speed threshold value Rth.

As shown in FIG. 11, the control circuit 4A includes a target rotational speed acquisition unit 41A, a rotational speed calculator 42A, a speed controller 43A, a maximum air volume controller 44A, a drive control signal generator 45A, a current value acquisition unit 46A, a memory unit 47A, a comparator (RCMP) 48A, and a comparator (ICMP) 49A as functional blocks for implementing the speed feedback control and the maximum air volume control.

The target rotational speed acquisition unit 41A acquires information on the target rotational speed Rtg of the motor 20 from the speed command signal Sc which is output from, for example, a host device existing outside the motor drive control device 1A, and provides the acquired information to the speed controller 43A and the maximum air volume controller 44A.

For example, when the speed command signal Sc is a PWM signal representing the target rotational speed Rtg by the duty ratio, the target rotational speed acquisition unit 41A analyzes the duty ratio of the PWM signal as the input speed command signal Sc to calculate the rotational speed corresponding to the duty ratio, and outputs the calculated rotational speed as the target rotational speed Rtg.

For example, the target rotational speed acquisition unit 41A has a table representing the correspondence relationship between the duty ratio of the PWM signal and the target rotational speed Rtg. The target rotational speed acquisition unit 41A reads out the target rotational speed Rtg corresponding to the duty ratio of the input speed command signal Sc from the table to acquire information on the target rotational speed Rtg from the speed command signal Sc.

The target rotational speed acquisition unit 41A is implemented, for example, by an external interface circuit, etc. of a microcontroller and program processing of CPU.

The rotational speed calculator 42A calculates the rotational speed (the number of revolutions per unit time) of the motor 20 based on the position detection signal Sh output from the position detection element 5. The rotational speed calculator 42A calculates the actual rotational speed of the rotor of the motor 20 by using the position detection signal Sh, and provides the calculated actual rotational speed as the actual rotational speed Rr to the speed controller 43A.

The rotational speed calculator 42A is implemented, for example, by an external interface circuit, etc. of a microcontroller and program processing of CPU like the target rotational speed acquisition unit 41A.

The speed controller 43A generates a PWM command signal (an example of the first control signal) Sp1 indicating the duty ratio of a PWM signal as the drive control signal Sd based on the target rotational speed Rtg output from the target rotational speed acquisition unit 41A and the actual rotational speed Rr of the motor 20 calculated by the rotational speed calculator 42A.

Specifically, the speed controller 43A generates the PWM command signal Sp1 so that the actual rotational speed Rr coincides with the target rotational speed Rtg. For example, the speed controller 43A calculates the difference between the actual rotational speed Rr and the target rotational speed Rtg, and calculates the duty ratio of the PWM signal as the drive control signal Sd so that the difference becomes zero. Then, the speed controller 43A outputs the information on the calculated duty ratio as the PWM command signal Sp1.

The current value acquisition unit 46A is a functional unit for calculating an actual current value of current flowing through the motor 20. The current value acquisition unit 46A includes, for example, an A/D conversion circuit for converting an analog signal into a digital signal. For example, the current value acquisition unit 46A is a $\Delta\Sigma$ modulation type analog/digital conversion circuit, and is configured by a dedicated logic circuit. The current value acquisition unit 46A converts an analog signal input from the current detector 6 into a digital signal by a $\Delta\Sigma$ modulation method.

The current value acquisition unit 46A converts a voltage Vs, which is an analog signal output from the current detector 6, into a digital signal, and outputs the digital signal as the actual current value Ir of the motor current of the motor 20.

The comparator (RCMP) 48A compares the target rotational speed Rtg with the rotational speed threshold value Rth, and outputs a comparison result.

The rotational speed threshold Rth is a rotational speed for defining the maximum air volume of the fan 100A as in the case of the first embodiment. For example, when it is desired to control the fan 100A along the P-Q curve 201_th shown in FIG. 9, the rotational speed Rx of the motor 20 at the point A at which the maximum air volume is obtained on the P-Q curve 201_th may be set as the rotational speed threshold value Rth (<Rmax). Information 471A of the rotational speed threshold value Rth is stored in the memory unit 47A.

The comparator 48A compares the rotational speed threshold value Rth read from the memory unit 47A with the target rotational speed Rtg output from the target rotational speed acquisition unit 41A. When the target rotational speed Rtg output from the target rotational speed acquisition unit 41A is larger than the rotational speed threshold value Rth, the comparator 48A outputs, for example, a high-level determination signal Scp1. On the other hand, when the target rotational speed Rtg output from the target rotational speed acquisition unit 41A is smaller than the rotational speed threshold value Rth, the comparator 48A outputs, for example, a low-level determination signal Scp1.

The comparator (RCMP) 48A compares the actual current value Ir of the motor current with the current threshold value Ith, and outputs a comparison result.

The current threshold value Ith is another parameter serving as a reference for switching the control mode (the speed feedback control and the maximum air volume control) of the fan 100A.

Figure 12:
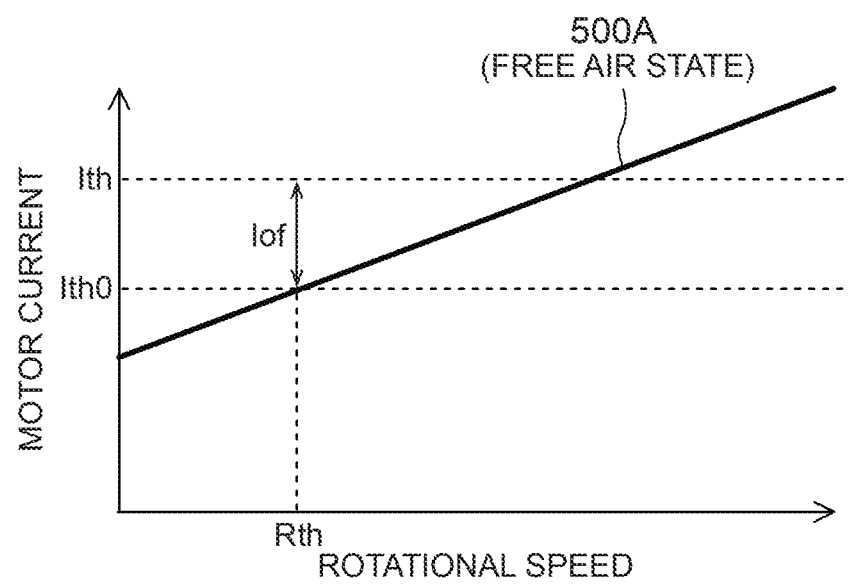
FIG. 12 is a view showing a method of determining a current threshold value.

FIG. 12 is a view showing a method of determining the current threshold value Ith.

In FIG. 12, the horizontal axis represents the rotational speed of the motor of the fan, and the vertical axis represents the motor current of the fan. Reference sign 500A represents a characteristic representing the relationship between the rotational speed and the motor current of the motor when the speed feedback control is performed in the free air state of the fan 100A.

The current threshold value Ith is determined based on the motor current when the fan 100A is rotating at a predetermined rotational speed. For example, as shown in FIG. 12, a value obtained by adding an offset amount Iof to a current value Ith0 of the motor current when the fan 100A is operating at the rotational speed corresponding to the rotational speed threshold value Rth in the free air state may be set as the current threshold value Ith.

Here, the offset amount Iof may be appropriately set according to the size (weight and shape) of the impeller 21 of the fan 100A, the number of turns of the coil (winding), the diameter of the coil conductor, and the like.

Information 472A on the current threshold value Ith is stored in the memory unit 47A.

The comparator (ICMP) 49A compares the current threshold value Ith read out from the memory unit 47A with the actual current value Ir of the motor current output from the current value acquisition unit 46A. When the actual current value Ir is larger than or equal to the current threshold value Ith (for example, in the case of Ir>or=Ith), the comparator 49A outputs, for example, a high-level determination signal Scp2. On the other hand, when the actual current value Ir is smaller than the current threshold value Ith (for example, in the case of Ir<Ith), the comparator 49A outputs, for example, a low-level determination signal Scp2.

The memory unit 47A is a functional unit for storing various parameters, calculation results, etc. for the speed feedback control and the maximum air volume control. For example, the memory unit 47A stores the above-described information 471A on the rotational speed threshold value Rth, information 472A on the current threshold value Ith, and the like. The memory unit 47A is implemented by a storage device such as RAM or ROM, a register, or the like.

The maximum air volume controller 44A generates a PWM command signal Sp2 (an example of a second control signal) indicating the duty ratio of a PWM signal as the drive control signal Sd based on the determination signal Scp1 of the comparator 48A, the determination signal Scp2 of the comparator 49A, and the rotational speed threshold value Rth.

Specifically, when the comparator 48A determines that the target rotational speed Rtg is higher than a predetermined value and the comparator 49A determines that the actual current value Ir is higher than the current threshold value Ith (Rtg>Rth and Ir>Ith), the maximum air volume controller 44A generates the PWM command signal Sp2 so that the motor 20 rotates at a constant rotational speed lower than the target rotational speed Rtg.

On the other hand, when the comparator 48A determines that the target rotational speed Rtg is lower than the rotational speed threshold value Rth, or when the comparator 49A determines that the actual current value Ir is lower than the current threshold value Ith (Rtg<Rth or Ir<Ith), the maximum air volume controller 44A does not generate the PWM command signal Sp2.

As described above, in the case of Rtg>Rth and Ir>Ith, the maximum air volume controller 44A generates the PWM command signal Sp2 so that the motor 20 rotates at a constant rotational speed lower than the target rotational speed Rtg. Specifically, the maximum air volume controller 44A generates the PWM command signal Sp2 so that the motor 20 rotates at a constant rotational speed corresponding to the rotational speed threshold value Rth.

For example, the maximum air volume controller 44A calculates the difference between the actual rotational speed Rr and the rotational speed threshold value Rth, and calculates the duty ratio of the PWM signal as the drive control signal Sd so that the difference becomes zero. Then, the maximum air volume controller 44A outputs information on the calculated duty ratio as the PWM command signal Sp2.

The drive control signal generator 45A is a functional unit for generating the drive control signal Sd for controlling the driving of the motor 20. The drive control signal generator 45A generates the drive control signal Sd based on the PWM command signal Sp1 output from the speed controller 43A and the PWM command signal Sp2 output from the maximum air volume controller 44A.

Specifically, when the PWM command signal Sp2 is not output from the maximum air volume controller 44A, the drive control signal generator 45A generates a PWM signal having a duty ratio indicated by the PWM command signal Sp1 output from the speed controller 43A, and outputs the generated PWM signal as the drive control signal Sd. When the PWM command signal Sp2 is output from the maximum air volume controller 44A, the drive control signal generator 45A generates a PWM signal having a duty ratio which is indicated, not by the PWM command signal Sp1, but by the PWM command signal Sp2 output from the maximum air volume controller 44A, and outputs the generated PWM signal as the drive control signal Sd.

The speed controller 43A, the maximum air volume controller 44A, the drive control signal generator 45A, and the comparators 48A and 49A described above are implemented, for example, by program processing of a microcontroller (CPU). Note that the comparators 48A and 49A may be implemented by a dedicated logic circuit or the like.

Next, the flow of the air volume control of the fan 100A will be described.

Figure 13:
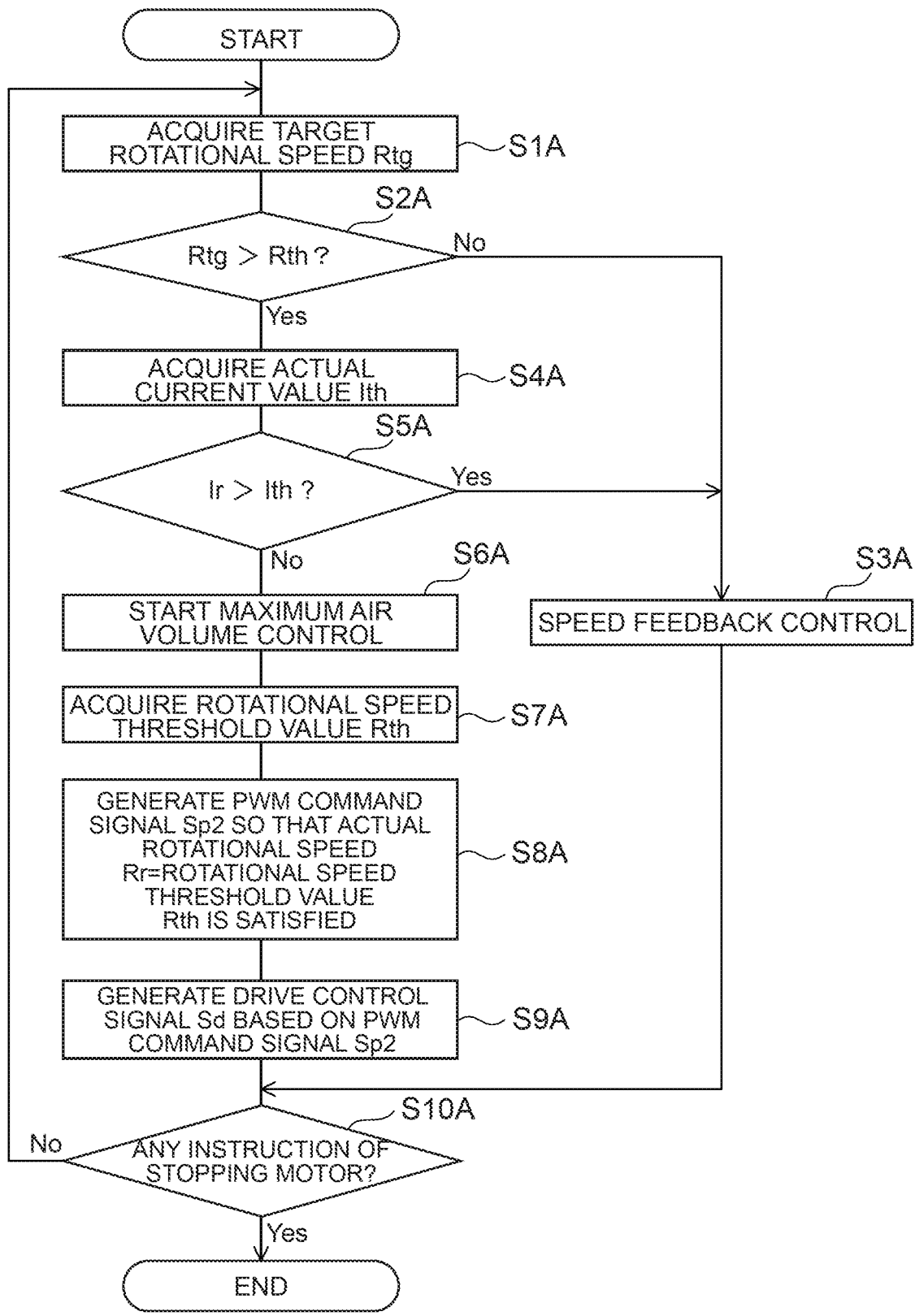
FIG. 13 is a flowchart showing a flow of processing relating to air volume control by the motor drive control device according to the second embodiment.

FIG. 13 is a flowchart showing the flow of processing related to air volume control by the motor drive control device 1A according to the second embodiment.

First, when the speed command signal Sc is input from a host device to the control circuit 4A, the target rotational speed acquisition unit 41A of the control circuit 4A acquires information on the target rotational speed Rtg from the speed command signal Sc (step S1A).

Next, the comparator 48A of the control circuit 4A determines whether the target rotational speed Rtg acquired in step S1A is larger than the rotational speed threshold value Rth (step S2A).

When the target rotational speed Rtg is smaller than the rotational speed threshold value Rth (step S2A: No), the control circuit 4A performs the speed feedback control (step S3A). In other words, as described above, the drive control signal generator 45A generates the drive control signal Sd based on the PWM command signal Sp1 generated by the speed controller 43A. As a result, the motor 20 operates so that the actual rotational speed Rr coincides with the target rotational speed Rtg. At this time, the maximum air volume controller 44A does not generate the PWM command signal Sp2.

On the other hand, when the target rotational speed Rtg is larger than the rotational speed threshold value Rth in step S2 (step S2A: Yes), the control circuit 4A acquires the actual current value Ir of the motor 20 (step S4A). Specifically, as described above, the comparator 49A acquires information on the actual current value Ir of the motor current calculated by the current value acquisition unit 46A.

Next, the comparator 49A determines whether the actual current value Ir of the motor 20 acquired in step S4A is larger than the current threshold value Ith (step S5A).

When the actual current value Ir is larger than the current threshold value Ith (step S5A: Yes), the control circuit 4A performs the speed feedback control (step S3A). In other words, as described above, the drive control signal generator 45A generates the drive control signal Sd based on the PWM command signal Sp1 generated by the speed controller 43A. As a result, the motor 20 operates so that the rotational speed of the motor 20 coincides with the target rotational speed Rtg.

On the other hand, when the actual current value Ir is smaller than the current threshold value Ith (step S5A: No), the control circuit 4A starts the maximum air volume control (step S6A).

In the maximum air volume control, the maximum air volume controller 44A first reads the information 471A of the rotational speed threshold value Rth from the memory unit 47A (step S7A).

Next, the maximum air volume controller 44A generates the PWM command signal Sp2 so that the actual rotational speed Rr of the motor 20 coincides with the rotational speed threshold value Rth (step S8A).

Next, the control circuit 4A generates the drive control signal Sd based on the PWM command signal Sp2 (step S9A). Specifically, the drive control signal generator 45A generates a PWM signal having a duty ratio indicated by the PWM command signal Sp2 output from the maximum air volume controller 44A in step S9, and outputs the generated PWM signal as the drive control signal Sd.

After steps S3 and S9, the control circuit 4A determines the presence or absence of an instruction for stopping the motor 20 (step S10A). When no instruction for stopping the motor 20 is given in step S10A (step S10A: No), the above-described processing (S1A to S10A) is repeatedly executed. On the other hand, when an instruction for stopping the motor 20 is received in step S10A (step S10A: Yes), the control circuit 4A terminates the processing of the air volume control.

Figure 14:
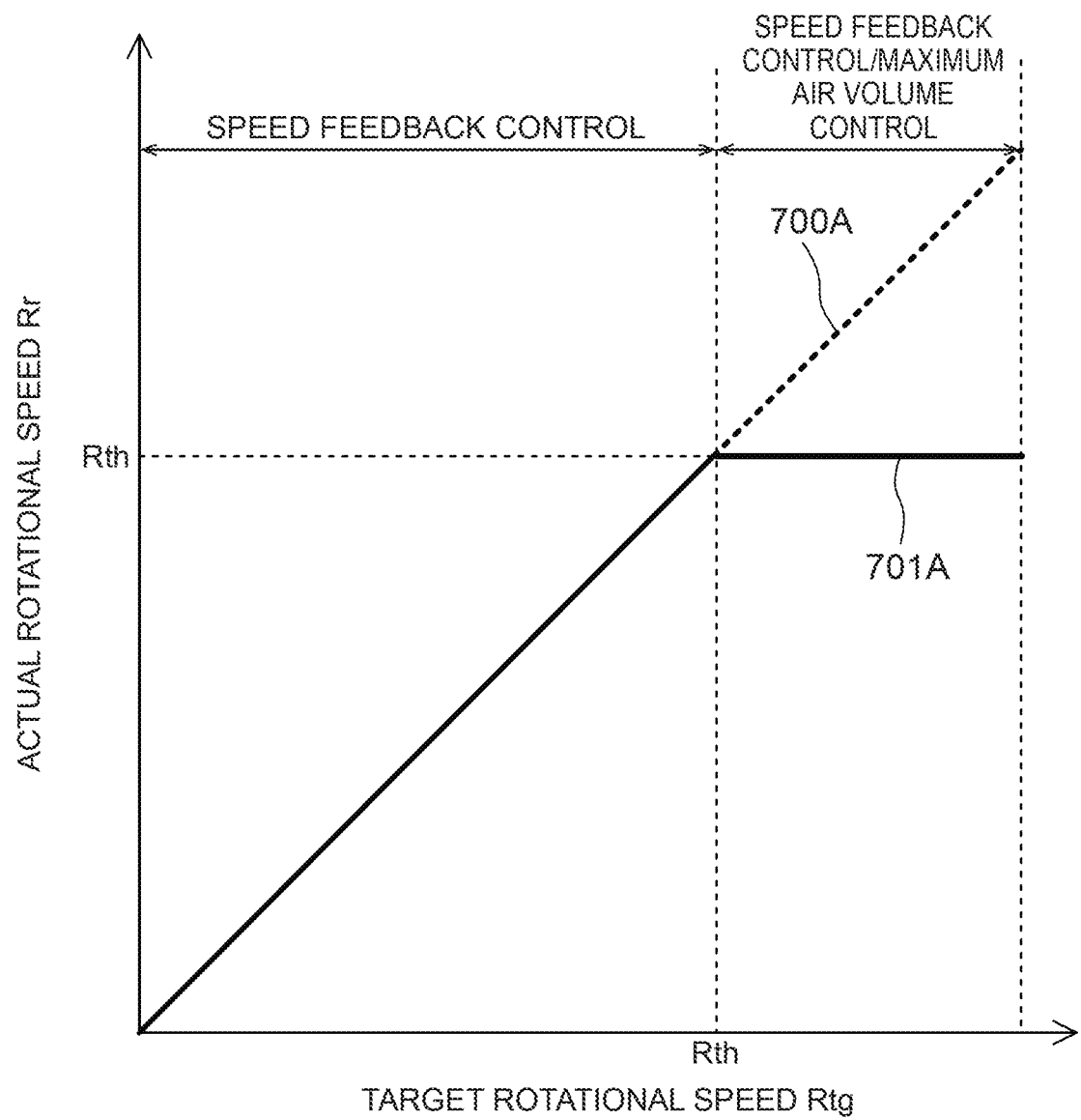
FIG. 14 is a view showing the relationship between a target rotational speed of the motor and an actual rotational speed in the fan according to the second embodiment.

FIG. 14 is a view showing the relationship between the target rotational speed and the actual rotational speed of the motor 20 in the fan 100A according to the second embodiment.

In FIG. 14, the horizontal axis represents the target rotational speed Rtg of the motor 20, and the vertical axis represents the actual rotational speed Rr of the motor 20. FIG. 14 shows the principle of switching the control mode by the motor drive control device 1A which focuses on the relationship between the target rotational speed Rtg and the actual rotational speed Rr.

As shown in FIG. 14, in the range where the target rotational speed Rtg indicated by the speed command signal Sc is smaller than the rotational speed threshold value Rth, the control circuit 4A performs the speed control feedback control. As a result, the fan 100A operates so that the actual rotational speed Rr of the motor 20 coincides with the target rotational speed Rtg.

On the other hand, in the range where the target rotational speed Rtg is larger than the rotational speed threshold value Rth, the control circuit 4A performs the switching between the speed feedback control and the maximum air volume control according to the comparison result between the actual current value Ir of the motor 20 and the current threshold value Ith.

In other words, in the range where the target rotational speed Rtg is larger than the rotational speed threshold value Rth and the actual current value Ir of the motor 20 is larger than the current threshold value Ith, it can be estimated that the external pressure (pressure resistance) to the fan 100A has been large. In this case, the control circuit 4A performs the speed feedback control in order to ensure a necessary air volume. As a result, as indicated by reference sign 700A, the fan 100A operates so that the actual rotational speed Rr of the motor 20 coincides with the target rotational speed Rtg, thereby ensuring a necessary air volume.

On the other hand, in the range where the target rotational speed Rtg is larger than the rotational speed threshold value Rth and the actual current value Ir of the motor 20 is smaller than the current threshold value Ith, it can be estimated that the external pressure to the fan 100A has been small and a sufficient air volume can have been secured. In this case, the control circuit 4A performs the maximum air volume control while giving priority to the air volume quietness. In other words, as indicated by reference sign 701A, the fan 100A (motor 20) rotates at a constant rotational speed (with the rotational speed threshold value Rth) lower than the indicated target rotational speed Rtg. As a result, it becomes possible to suppress the air volume.

Figure 15:
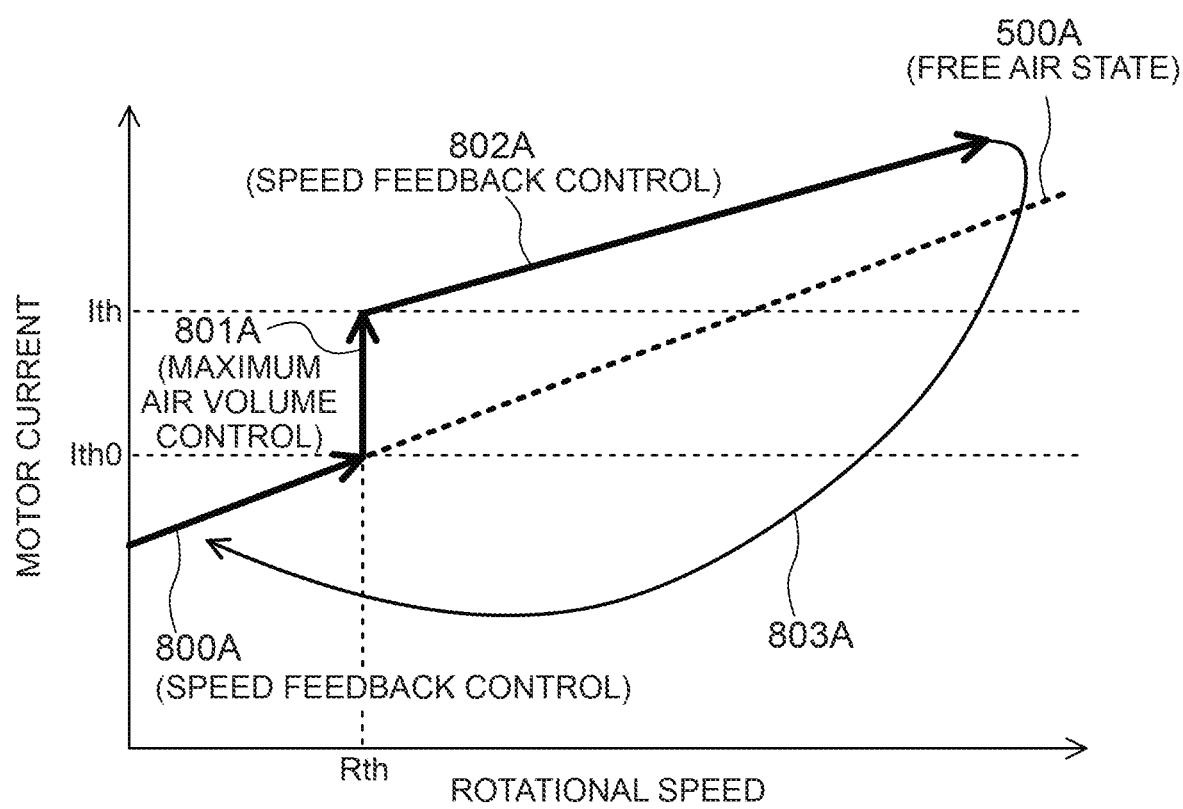
FIG. 15 is a view showing the relationship between the motor current and the rotational speed of the motor in the fan according to the second embodiment.

FIG. 15 is a view showing the relationship between the motor current and the rotational speed of the motor 20 in the fan 100A according to the second embodiment.

In FIG. 15, the horizontal axis represents the rotational speed of the motor 20, and the vertical axis represents the motor current of the motor 20. FIG. 15 shows a flow of switching the control mode by the motor drive control device 1A which focuses on the relationship between the rotational speed (actual rotational speed Rr) and the motor current of the motor 20.

As shown in FIG. 15, the fan 100A according to the second embodiment performs normal speed feedback control in a range where the target rotational speed Rtg indicated by the speed command signal Sc is lower than the rotational speed threshold value Rth. As a result, as indicated by reference sign 800A, the fan 100A operates so that the rotational speed of the motor 20 coincides with the target rotational speed Rtg.

Thereafter, when the target rotational speed Rtg indicated by the speed command signal Sc exceeds the rotational speed threshold value Rth, the fan 100A performs the maximum air volume control. As a result, as indicated by reference sign 801A, the fan 100A operates so that the rotational speed becomes constant (rotational speed threshold value Rth) regardless of the target rotational speed Rtg until the motor current exceeds the current threshold value Ith.

Thereafter, when the external pressure of the fan 100A increases and the actual current value Ir of the motor current exceeds the current threshold value Ith, the fan 100A performs the speed feedback control. As a result, as indicated by reference sign 802A, the fan 100A operates so that the rotational speed of the motor 20 coincides with the target rotational speed Rtg.

When the target rotational speed Rtg lower than the rotational speed threshold value Rth is indicated by the speed command signal Sc, the fan 100A returns to the normal speed feedback control again as indicated by reference sign 803A.

As described above, in a state where the target rotational speed Rtg is higher than the rotational speed threshold value Rth, the fan 100A according to the second embodiment operates so that the rotational speed of the motor 20 is constant regardless of the target rotational speed Rtg when the motor current is lower than the current threshold value Ith, and operates so that the rotational speed of the motor 20 coincides with the target rotational speed Rtg when the motor current is higher than the current threshold value Ith. As a result, the fan 100A can limit the maximum air volume in a region where the static pressure is low (for example, a range where the static pressure on the P-Q curves in FIG. 9 is lower than Pb).

As described above, when the target rotational speed Rtg indicated by the speed command signal Sc is lower than the rotational speed threshold value Rth, the motor drive control device 1A according to the second embodiment performs the speed feedback control for generating the drive control signal Sd so that the rotational speed (actual rotational speed Rr) of the motor 20 coincides with the target rotational speed Rtg, and when the target rotational speed Rtg is higher than the rotational speed threshold value Rth, based on the comparison result between the motor current of the motor 20 and the current threshold value Ith, the motor drive control device 1A according to the second embodiment performs the switching between the speed feedback control and the maximum air volume control for generating the drive control signal Sd so that the rotational speed of the motor 20 does not exceed the rotational speed threshold value Rth.

According to this control method, as described above, in the range where the target rotational speed Rtg is lower than the rotational speed threshold value Rth, the motor 20 is driven so that the air volume of the fan 100A increases in proportion to the indicated target rotational speed Rtg. On the other hand, in the range where the target rotational speed Rtg is higher than the rotational speed threshold value Rth, the motor 20 is driven so that the air volume of the fan 100A changes according to the static pressure.

As described above, in the fan, the motor current and the external pressure are in a substantially proportional relationship. Therefore, in the fan 100A according to the second embodiment, the current threshold value Ith is set as a reference value for determining whether the external pressure is in a high state or in a low state, and the current threshold value Ith is compared with the motor current of motor 20, whereby it is estimated whether the external pressure is in the high state or not, and the motor control method is switched.

Specifically, in the state where the target rotational speed Rtg is higher than the rotational speed threshold value Rth, the fan 100A performs the speed feedback control when the current flowing through the motor 20 is larger than the current threshold value Ith, and performs the maximum air volume control when the current flowing through the motor 20 is smaller than the current threshold value Ith.

As a result, when the external pressure of the fan 100A is lower than a predetermined pressure (static pressure) corresponding to the current threshold value Ith, the fan 100A suppresses the rotational speed of the motor 20 to be lower than the target rotational speed Rtg by the maximum air volume control, and operates so as to suppress the air volume. On the other hand, when the external pressure of the fan 100A is higher than the predetermined pressure (static pressure) corresponding to the current threshold value Ith, the fan 100A controls the rotational speed of the motor 20 so that the rotational speed of the motor 20 coincides with the target rotational speed Rtg by the speed feedback control, and operates so as to obtain a required air volume.

As described above, according to the fan 100A to which the motor drive control device 1A according to the second embodiment is applied, a sufficient air volume can be secured in a required operating range in a region where the static pressure is higher than a predetermined value, and the air volume can be suppressed regardless of an indicated target rotational speed Rtg in a region where the static pressure is lower than the predetermined value, whereby occurrence of noise and increase of power consumption of the fan 100A can be suppressed.

Further, the motor drive control device 1A according to the embodiment generates the drive control signal Sd in the maximum air volume control so that the motor 20 rotates at a constant rotational speed corresponding to the rotational speed threshold value Rth.

According to this control method, the motor 20 can be stably rotated at a constant rotational speed under the maximum air volume control, so that it is possible to further improve the stability and quietness of the operation of the fan 100A under the maximum air volume control.

Note that the maximum air volume control by the motor drive control device 1A according to the second embodiment is performed to control the air volume so that the maximum air volume is equal to a desired value according to the relationship between the rotational speed and the pressure loss of the motor 20 when the target rotational speed Rtg is higher than the rotational speed threshold Rth, and it is not necessarily performed to control the air volume so that the air volume is kept constant. Accordingly, this maximum air volume control differs from the conventional so-called constant air volume control in the control method and its effect.

Expansion of the Embodiments

The disclosure provided by the present inventors has been specifically described based on the embodiments, but it is needless to say that the disclosure is not limited to the above embodiments, and can be variously modified without departing from the subject matter of the disclosure.

For example, in the first embodiment, the case where the relational expression or table representing the characteristic 500 between the motor current and the rotational speed on the maximum air volume control line C is set as the correspondence relationship information 471 has been exemplified. However, the disclosure is not limited to this mode. For example, it is possible to use the characteristic 500 as a reference, perform a correction of adding or subtracting an offset amount to or from the reference, and use a relational expression or table representing the corrected characteristic as the correspondence relationship information 471.

In the first embodiment, as shown in FIG. 5A, the case where the rotational speed of the motor 20 is not changed in the range Mh and the range Ml is exemplified, but the disclosure is not limited to this mode. For example, in the range Mh and the range Ml, the rotational speed of the motor 20 may be reduced with an adjustment width smaller than the adjustment width of the range H and the range L. For example, when the adjustment range of the duty ratio of the drive control signal Sd in the range H and the range L is set to "±0.5%", the adjustment range of the duty ratio of the drive control signal Sd in the range Mh and the range Ml may be set to "±0.1%".

In the first and second embodiments, the case where the speed command signal Sc is a PWM signal and the target rotational speed Rtg is indicated by the duty ratio of the PWM signal is exemplified, but the disclosure is not limited to this mode. For example, the speed command signal Sc may be an analog signal, and the target rotational speed Rtg may be indicated by the voltage level of the analog signal.

In the first and second embodiments, the case where the motor 20 is a three-phase brushless motor is exemplified, but the type of motor 20, the number of phases of the motor 20, etc. are not limited to this mode. For example, a single-phase brushless motor may be used.

The above-mentioned flowcharts show examples showing the operation, and are not limited to these flowcharts. In other words, the steps shown in each figure of the flowcharts are specific examples and are not limited to those of these flowcharts. For example, the order of some steps may be changed, other steps may be inserted between respective steps, or some steps may be performed in parallel.

What is claimed is:
1. A motor drive control device comprising:
a control circuit for generating a drive control signal for controlling a rotational speed of a motor based on a speed command signal indicating a target rotational speed of the motor; and
a motor driving unit for driving the motor based on the drive control signal, wherein the control circuit performs speed feedback control for generating the drive control signal so that the rotational speed of the motor coincides with the target rotational speed when the target rotational speed is lower than a rotational speed threshold value, and generates the drive control signal based on a relationship between current flowing through the motor and a reference current value when the target rotational speed is higher than the rotational speed threshold value,
wherein the reference current value is a target current value to be calculated in association with the rotational speed of the motor, the control circuit calculates the target current value using the actual rotational speed, and the control circuit performs maximum air volume control for generating the drive control signal so that the current flowing through the motor approaches the target current value when the target rotational speed is higher than the rotational speed threshold value.

2. The motor drive control device according to claim 1, wherein the control circuit calculates an actual rotational speed of the motor based on a position detection signal indicating a rotational position of the motor, and calculates the target current value based on prestored correspondence relationship information indicating correspondence relationship between the rotational speed of the motor and the target current value, and the calculated actual rotational speed.

3. The motor drive control device according to claim 2, wherein the motor rotates an impeller of a fan, and the correspondence relationship represents relationship between the rotational speed of the motor and the target current value in a region where a static pressure of the fan is lower than a predetermined value.

4. The motor drive control device according to claim 2, wherein under the maximum air volume control, the control circuit generates the drive control signal so that the rotational speed of the motor increases when current flowing through the motor is higher than the target current value, and generates the drive control signal so that the rotational speed of the motor decreases when the current flowing through the motor is lower than the target current value.

5. The motor drive control device according to claim 4, wherein under the maximum air volume control, the control circuit generates the drive control signal so as to increase the rotational speed of the motor when the current flowing through the motor is higher than a predetermined range containing the target current value, so as to make the rotational speed of the motor unchanged when the current flowing through the motor is within the predetermined range, and so as to reduce the rotational speed of the motor when the current flowing through the motor is lower than the predetermined range.

6. The motor drive control device according to claim 2, wherein the control circuit comprises:
a rotational speed calculator for calculating the actual rotational speed based on the position detection signal;
a speed controller for generating a first control signal so that the actual rotational speed calculated by the rotational speed calculator coincides with the target rotational speed indicated by the speed command signal;
a target current value calculator for calculating the target current value based on the actual rotational speed calculated by the rotational speed calculator;
a current value acquisition unit for acquiring a current value of current flowing through the motor;
a maximum air volume controller for generating a second control signal so that the current flowing through the motor approaches the target current value when the target rotational speed is higher than the rotational speed threshold value; and
a drive control signal generator for generating the drive control signal based on the first control signal and the second control signal.

7. The motor drive control device according to claim 1, wherein the reference current value is a current threshold value for estimating an external pressure, and when the target rotational speed is higher than the rotational speed threshold value, based on a comparison result between an actual current value of the current flowing through the motor and the current threshold value, the control circuit performs switching between the speed feedback control and the maximum air volume control for generating the drive control signal so that the rotational speed of the motor does not exceed the rotational speed threshold value.

8. The motor drive control device according to claim 7, wherein under a state where the target rotational speed is higher than the rotational speed threshold value, the control circuit performs the speed feedback control when the actual current value is larger than the current threshold value, and performs the maximum air volume control when the actual current value is smaller than the current threshold value.

9. The motor drive control device according to claim 7, wherein the control circuit generates the drive control signal in the maximum air volume control so that the motor rotates at a rotational speed corresponding to the rotational speed threshold value.

10. The motor drive control device according to claim 7, wherein the control circuit comprises:
a rotational speed calculator for calculating an actual rotational speed of the motor based on a position detection signal indicating a rotational position of the motor;
a speed controller for generating a first control signal so that the actual rotational speed calculated by the rotational speed calculator coincides with the target rotational speed indicated by the speed command signal;
a current value acquisition unit for acquiring the actual current value;
a maximum air volume controller for generating a second control signal so that the rotational speed of the motor does not exceed the rotational speed threshold value when the target rotational speed is larger than the rotational speed threshold value and the actual current value acquired by the current value acquisition unit is larger than the current threshold value; and
a drive control signal generator for generating the drive control signal based on the first control signal or the second control signal.

11. A fan comprising:
an impeller configured to be rotatable by rotational force of the motor; and
a motor drive control device for controlling driving of the motor, wherein the motor drive control device comprises a control circuit for generating a drive control signal for controlling a rotational speed of the motor based on a speed command signal indicating a target rotational speed of the motor, and a motor driving unit for driving the motor based on the drive control signal, and the control circuit performs speed feedback control for generating the drive control signal so that the rotational speed of the motor coincides with the target rotational speed when the target rotational speed is lower than a rotational speed threshold value, and generates the drive control signal based on a relationship between current flowing through the motor and a reference current value when the target rotational speed is higher than the rotational speed threshold value,
wherein the reference current value is a target current value to be calculated in association with the rotational speed of the motor, the control circuit calculates the target current value using the actual rotational speed, and the control circuit performs maximum air volume control for generating the drive control signal so that current flowing through the motor approaches the target current value when the target rotational speed is higher than the rotational speed threshold value.

12. The fan according to claim 11, wherein when the target rotational speed is higher than the rotational speed threshold value, based on a comparison result between an actual current value of current flowing through the motor and a current threshold value, the control circuit performs switching between the speed feedback control and the maximum air volume control for generating the drive control signal so that the rotational speed of the motor does not exceed the rotational speed threshold value.

13. A motor drive control method of generating a drive control signal for controlling driving of a motor based on a speed command signal indicating a target rotational speed of the motor, and driving the motor based on the drive control signal, comprising:
- a first step of performing speed feedback control for generating the drive control signal so that a rotational speed of the motor coincides with the target rotational speed when the target rotational speed is lower than a rotational speed threshold value; and
- a second step of generating the drive control signal based on a relationship between current flowing through the motor and a reference current value when the target rotational speed is higher than the rotational speed threshold value,
- wherein the reference current value is a target current value to be calculated in association with a rotational speed of the motor, the second step includes a third step of calculating the target current value using the actual rotational speed and a fourth step of performing maximum air volume control for generating the drive control signal so that current flowing through the motor approaches the target current value when the target rotational speed is higher than the rotational speed threshold value.

14. The motor drive control method according to claim 13, wherein the reference current value is a current threshold value for estimating an external pressure, and based on a comparison result between an actual current value of current flowing through the motor and the current threshold value, switching between the speed feedback control and maximum air volume control for generating the drive control signal so that the rotational speed of the motor does not exceed the rotational speed threshold value when the target rotational speed is higher than the rotational speed threshold value.

* * * * *